United States Patent
Chiefari et al.

(10) Patent No.: US 11,522,220 B2
(45) Date of Patent: Dec. 6, 2022

(54) ELECTROLYTE COMPOSITION

(71) Applicant: Commonwealth Scientific and Industrial Research Organisation, Acton (AU)

(72) Inventors: John Chiefari, Clayton (AU); Kristine Barlow, McKinnon (AU); Nicolas Goujon, Box Hill South (AU); Xiaojuan Hao, Clayton (AU); Maria Forsyth, Ashburton (AU); Patrick C. Howlett, Box Hill South (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 268 days.

(21) Appl. No.: 16/649,753

(22) PCT Filed: Nov. 2, 2018

(86) PCT No.: PCT/AU2018/051189
§ 371 (c)(1),
(2) Date: Mar. 23, 2020

(87) PCT Pub. No.: WO2019/084623
PCT Pub. Date: May 9, 2019

(65) Prior Publication Data
US 2020/0280095 A1    Sep. 3, 2020

(30) Foreign Application Priority Data

Nov. 2, 2017  (AU) .................................. 2017904460

(51) Int. Cl.
*H01M 10/0565* (2010.01)
*C08F 293/00* (2006.01)
(Continued)

(52) U.S. Cl.
CPC ....... *H01M 10/0565* (2013.01); *C08F 293/00* (2013.01); *C08K 3/08* (2013.01);
(Continued)

(58) Field of Classification Search
None
See application file for complete search history.

(56) References Cited

U.S. PATENT DOCUMENTS

2014/0088207 A1*  3/2014  Elabd .................. B01J 41/00
                                                521/38
2016/0013515 A1    1/2016  Lee et al.
(Continued)

FOREIGN PATENT DOCUMENTS

EP  3 076 470 A1   5/2016
JP  2017518625 A   7/2017
(Continued)

OTHER PUBLICATIONS

Bouchet, R., et al.; "Single-ion BAB Triblock Copolymers as Highly Efficient Electrolytes for Lithium-metal Batteries"; Nature Materials; vol. 12; May 2013; pp. 452-457.
(Continued)

*Primary Examiner* — Wyatt P McConnell
(74) *Attorney, Agent, or Firm* — Crowell & Moring LLP

(57) ABSTRACT

An electrolyte composition comprising (i) a block copolymer, (ii) an organic electrolyte (e.g. an ionic liquid), and (iii) a lithium salt, wherein the block copolymer comprises a non-ionic block and an ionic block, the non-ionic block comprising polymerised residues of hydrophobic monomers, and the ionic block comprising polymerised monomer residues having covalently coupled thereto (a) a pendant organic ionic liquid cation, the pendant organic ionic liquid cation having a counter anion, (b) a pendant anionic moiety, the pendant anionic moiety having a counter cation, or (c) a
(Continued)

combination thereof, and the electrolyte composition has at least two glass transition temperature (Tg) values.

23 Claims, 18 Drawing Sheets

(51) Int. Cl.
    *C08K 3/08*     (2006.01)
    *C08K 5/41*     (2006.01)
    *H01M 4/485*     (2010.01)
    *H01M 4/587*     (2010.01)
    *H01M 10/0525*     (2010.01)

(52) U.S. Cl.
    CPC .............. *C08K 5/41* (2013.01); *H01M 4/485* (2013.01); *H01M 4/587* (2013.01); *H01M 10/0525* (2013.01); *C08K 2003/0818* (2013.01); *H01M 2300/0045* (2013.01); *H01M 2300/0082* (2013.01); *H01M 2300/0091* (2013.01)

(56) References Cited

U.S. PATENT DOCUMENTS

2017/0179468 A1    6/2017   Fanous et al.
2017/0194633 A1    7/2017   Schumann et al.

FOREIGN PATENT DOCUMENTS

WO    WO 2014/043083 A2    3/2014
WO    WO 2015/185754 A2   12/2015

OTHER PUBLICATIONS

International Search Report for PCT/AU2018/051189 dated Dec. 20, 2018.
Written Opinion for PCT/AU2018/051189 dated Dec. 20, 2018.
Choi, Jae-Hong et al., Network Structure and Strong Microphase Separation for High Ion Conductivity in Polymerized Ionic Liquid Block Copolymers, Macromolecules, pubs.acs.org/Macromolecules, ACS Publications, Rvsd. Jun. 11, 2013, 11 pp.
Australian Patent Office International-Type Search Report for 2017904460, dated Dec. 8, 2017, 11 pp.
Coupillaud, P., "Thèse En Cotutelle Presèntée Pour Obtenir Le Grade De Reactive Poly(ionic liquid)s (PILs) and Nanostructures from PIL-based Block Copolymers", Nov. 20, 2014 (together with a machine translation), XP055688071 (223 pages).
Meek, K.M. et al, "Polymerized ionic liquid block copolymers for electrochemical energy", Journal of Materials Chemistry A, vol. 3, No. 48, Jan. 1, 2015 (Jan. 1, 2015), pp. 24187-24194, XP055808270 (eight (8) pages).
Green, M. D. et al, "Synthesis of Imidazolium-Containing ABA Triblock Copolymers: Role of Charge Placement, Charge Density, and Ionic Liquid Incorporation", Macromolecules, vol. 45, No. 11, Jun. 12, 2012 (Jun. 12, 2012), pp. 4749-4757, XP055309581 (nine (9) pages).
Fedelich, N., "Application Handbook Thermal Analysis of Polymers Selected Applications Thermal Analysis", Jan. 1, 2013, XP055608279 (40 pages).
Extended European Search Report issued in European Application No. 18873129.3 dated Jun. 8, 2021 (11 pages).
English translation of corresponding Japanese Office Action dated May 9, 2022, for Japanese Application No. 2020-518037.

* cited by examiner

A

B a)

b)

ELECTROLYTE COMPOSITION

CROSS-REFERENCE TO RELATED APPLICATIONS

The present application is the U.S. National Stage application of PCT Application No. PCT/AU2018/051189, filed on Nov. 2, 2018, designating the United States, which claims priority from Australian Patent Application No. 2017904460 filed on Nov. 2, 2017, the content of which is incorporated herein by reference.

FIELD OF THE INVENTION

The present invention relates to electrolyte compositions, and in particular to block copolymer electrolyte compositions and devices comprising the same.

BACKGROUND OF THE INVENTION

Solid-state polymer electrolytes are a promising substitute to liquid electrolytes for the fabrication of high performance ion conducting electrolytes, and in particular high-performance lithium-ion conducting electrolytes. Polymer electrolytes promise an improvement of the overall electrochemical performance and safety of lithium-based devices due to their good shape flexibility, suppression of dendrite growth, removal of leakage issues and lower flammability relative to liquid electrolytes.

Block copolymer electrolytes form part of a particular class of polymer electrolytes that have recently attracted attention due to their highly customisable chemical nature. However, polymer electrolytes prepared to date have generally been found to be defective in either ionic conductivity and/or mechanical stability. Poor ionic conductivity leads to the production of solid-state devices that suffer from low storage capacity, energy and power. On the other hand, poor mechanical stability adversely affects the electrochemical stability and/or cycleability of the electrolyte.

Accordingly, there remains an opportunity to develop block copolymer electrolytes that can provide ionic conductivities comparable to those of their liquid counterparts, as well as sufficiently good mechanical properties to ensure electrochemical stability and cycleability.

SUMMARY OF THE INVENTION

The present invention relates to electrolyte compositions obtained by combining a block copolymer, an organic electrolyte, and a lithium salt. It has surprisingly been observed that by controlling the glass transition temperature (Tg) profile of the electrolyte composition it is possible to provide solid-state electrolytes having high electrochemical and mechanical stability. This may be achieved, for example, by tuning a number of chemical and physical parameters of the composition which include the molar weight of the copolymer, the amount of lithium contained in the electrolyte composition, and the amount and type of the organic electrolyte.

Accordingly, the present invention provides an electrolyte composition comprising (i) a block copolymer, (ii) an organic electrolyte, and (iii) a lithium salt, wherein the block copolymer comprises a non-ionic block and an ionic block, the non-ionic block comprising polymerised residues of hydrophobic monomers, and the ionic block comprising polymerised monomer residues having covalently coupled thereto (a) a pendant organic ionic liquid cation, the pendant organic ionic liquid cation having a counter anion, (b) a pendant anionic moiety, the pendant anionic moiety having a counter cation, or (c) a combination thereof, and wherein the electrolyte composition has at least two glass transition temperature (Tg) values.

The at least two Tg values of the electrolyte composition is characteristic of its morphology having micro-phase separation. Without wanting to be confined by theory, such morphology is believed to be beneficial to both the ionic conductivity and the mechanical properties of the composition. For example, it is believed an electrolyte composition morphology characterised by micro-phase separation ensures preferential pathways for ionic diffusion, thus promoting ionic conductivity. On the other hand, it is believed that such micro-phase separation emphasises the composite-like character of the composition, thus improving its overall mechanical properties. It was surprising to observe multiple glass transition temperatures characteristic after the addition of an organic electrolyte (e.g. an ionic liquid), the counter ions and lithium salt to the block copolymer, since these types of additions traditionally have caused block copolymers to plasticise.

Advantageously, the electrolyte of the present invention can present as a solid at nominal operational conditions of an electrochemical device. For example, the composition may present as a solid at least at room temperature, for example at about 20° C. By the electrolyte composition presenting "as a solid", the composition is characterised by sufficient structural rigidity to support its own weight and maintain its shape in the absence of external factors such as constrictions (e.g. a container) or applied forces. In some embodiments, the electrolyte composition presents as a solid at least at about 30° C., about 50° C., about 70° C., or about 80° C. For example, the electrolyte composition may present as a solid at a temperature up to 100° C.

In some embodiments, the molar weight of the non-ionic block combined with the ionic block is less than 40,000 g/mol.

It was surprisingly observed that copolymers in which the molar weight of the non-ionic block combined with the ionic block is less than 40,000 g/mol offer a particularly advantageous balance between ionic conductivity and mechanical stability. Without wanting to be confined by theory, it is believed that such a range of molar weights assists with the compactness of the overall polymer structure, at the same time reducing resistance to ionic diffusion.

In some embodiments, the lithium salt is present in an amount of at least 11 wt. % relative to the total weight of the electrolyte composition.

A content of at least 11% weight percent of lithium salt in the electrolyte composition assists with both high ionic conductivity and mechanical stability.

In further embodiments, the organic electrolyte is present in an amount of less than 55 wt. % relative to the total weight of the electrolyte composition.

Without wanting to be confined by theory, it is believed an amount of organic electrolyte of less than 55.0 wt. % relative to the total weight of the electrolyte composition reduces adverse plasticising effects and/or assists in providing an advantageous balance between high ionic conductivity and mechanical stability of the electrolyte composition.

In some embodiments, the organic electrolyte is an organic ionic liquid having a cation and a counter anion, the organic ionic liquid not being covalently coupled to the block copolymer.

Accordingly, the present invention also provides an electrolyte composition comprising (i) a block copolymer, (ii) an organic ionic liquid having a cation and a counter anion, the organic ionic liquid not being covalently coupled to the block copolymer, and (iii) a lithium salt, wherein the block copolymer comprises a non-ionic block and an ionic block, the non-ionic block comprising polymerised residues of hydrophobic monomers, and the ionic block comprising polymerised monomer residues having covalently coupled thereto (a) a pendant organic ionic liquid cation, the pendant organic ionic liquid cation having a counter anion, (b) a pendant anionic moiety, the pendant anionic moiety having a counter cation, or (c) a combination thereof, and wherein the electrolyte composition has at least two glass transition temperature (Tg) values.

For convenience, the organic ionic liquid not covalently coupled to the block copolymer may herein be referred to as "uncoupled ionic liquid" or "free ionic liquid".

The organic ionic liquid not covalently coupled to the block copolymer may be present in an amount of less than 55 wt. % relative to the total weight of the electrolyte composition.

Without wanting to be confined by theory, it is believed an amount of uncoupled ionic liquid of less than 55.0 wt. % relative to the total weight of the electrolyte composition reduces adverse plasticising effects and/or assists in providing an advantageous balance between high ionic conductivity and mechanical stability of the electrolyte composition.

In some embodiments, the cation of the organic liquid that is not covalently coupled to the block copolymer is selected from an ammonium cation, a pyridinium cation, a pyrrolidinium cation, a phosphonium cation, and a combination thereof. It was surprisingly observed the choice of the cation selected from an ammonium cation, a pyridinium cation, phosphonium cation, a pyrrolidinium cation, and a combination thereof promotes formation of particularly stable Solid-Electrolyte Interface (SEI) on the surface of an electrode. That advantageously assists with the cycleability of a device comprising the electrode since the tendency to form dendrites is reduced, in turn increasing the safety characteristics of the device.

The electrolyte composition according to the invention has at least two glass transition temperature (Tg) values as measured by Differential Scanning Calorimetry (DSC), and may also have one or more features selected from:

the molar weight of the non-ionic block combined with the ionic block being less than 40,000 g/mol;

the lithium salt being present in an amount of at least 11 wt. % relative to the total weight of the electrolyte composition;

the organic electrolyte (e.g. an organic ionic liquid not covalently coupled to the block copolymer) being present in an amount of less than 55 wt. % relative to the total weight of the electrolyte composition; and the organic electrolyte being an organic ionic liquid not covalently coupled to the block copolymer which has a cation selected from an ammonium cation, a pyridinium cation, a pyrrolidinium cation, phosphonium cation, and a combination thereof.

Where one or more of such additional features form part of the electrolyte composition according to the invention, further improved properties can advantageously be achieved. The present invention also provides a lithium-based electrochemical cell comprising a negative electrode and an electrolyte composition as described herein.

Further aspects and embodiments of the invention are described in more detail below.

BRIEF DESCRIPTION OF THE DRAWINGS

Embodiments of the invention will be now described with reference to the following non-limiting drawings, in which.

and S-sTFSI/Li(64-17) copolymers used at a 1/2 molar ratio, or (D) a S-sTFSI/Li(64-17) copolymer.

Figure 1:
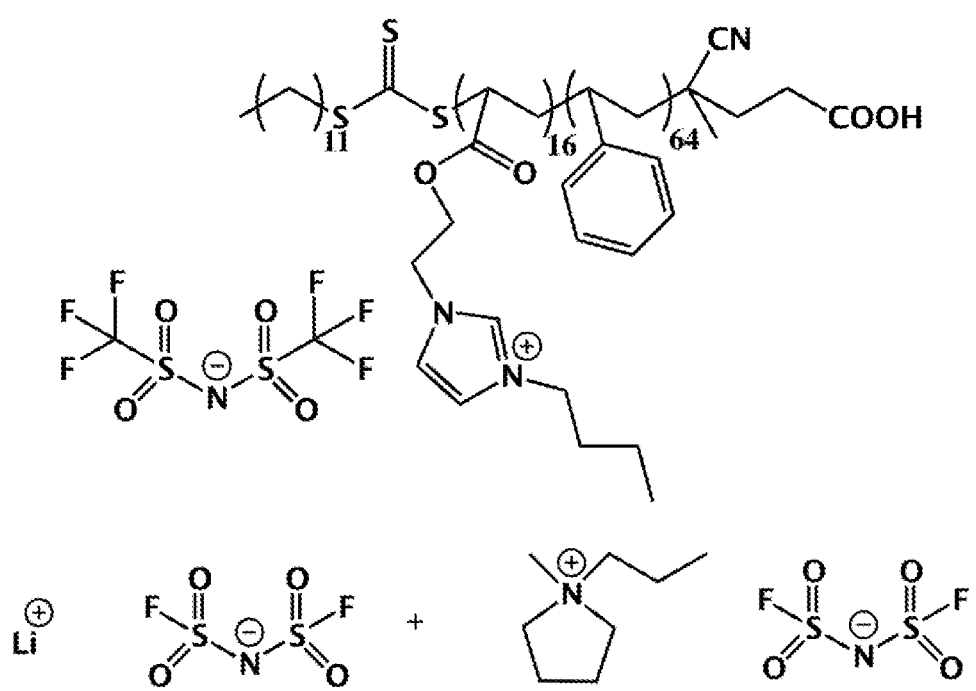
FIG. 1 shows the molecular structure of an electrolyte composition comprising poly(styrene-b-1-((2-acryloyloxy)ethyl)-3-butylimidazolium bis(trifluoromethanesulfonyl)imide) with a degree of polymerisation of 64 and 16, respectively (S-ImTFSI (64-16)), lithium bis(fluorosulfonyl)imide salt (LiFSI), and N-propyl-N-methylpyrrolidinium bis(fluorosulfonyl)imide ionic liquid ($C_3$mpyrFSI)

Some Figures contain colour representations or entities. Coloured versions of the Figures are available upon request.

DETAILED DESCRIPTION OF THE INVENTION

The electrolyte composition of the present invention comprises a block copolymer. By "block copolymer" is meant a polymer chain that comprises (i) polymerised monomer residues that provide for a non-ionic block, and (ii) polymerised monomer residues that provide for an ionic block. For example, the block copolymer may be an AB di-block linear copolymer, where A represents a non-ionic block and B represents an ionic block. The block copolymer may comprise more than two blocks. For example, the block copolymer may be a tri-block copolymer.

In one embodiment, the block copolymer only comprises a non-ionic block and an ionic block.

The block copolymer of the present invention comprises a non-ionic block. By the expression "non-ionic block" is meant a polymer block that does not contain ionic charge. In other words, the non-ionic block is a neutral polymer block.

The non-ionic block comprises polymerised residues of hydrophobic monomers. By "hydrophobic monomers" is meant monomers that when homo-polymerised or co-polymerised with each other form polymer that is substantially insoluble in water.

Provided the required hydrophobic character is derived, there is no limitation as to the type of the residues of hydrophobic monomers that can be used for the purpose of the present invention. For example, the residues of hydrophobic monomers may be derived from acrylate monomer, vinyl monomer, styrenic monomer, or combinations thereof.

In one embodiment, the non-ionic block may be described as a hydrophobic non-ionic block.

In some embodiments the residues of hydrophobic monomers are derived from styrene or styrene derivatives, indene or indene derivatives, vinylpyridine or vinylpyridine derivatives, methyl methacrylate or methacrylate derivatives, or a combination thereof. For example, residues of hydrophobic monomers may be derived from α-methylstyrene, methylstyrene, chlorostyrene, hydroxystyrene, vinylbenzyl chloride, methylindene, ethylindene, trimethylindene, vinylmethylpyridine, vinylbutylpyridine, vinylquinioline, vinylacrydine, hydroxyethyl methacrylate, dimethylaminoethyl methacrylate, vinylcarbazole, or a combination thereof. In some preferred embodiments, the residues of hydrophobic monomers are derived from styrene.

In some embodiments, the non-ionic block comprises a repeating unit having either of the following structures (I) and (II):

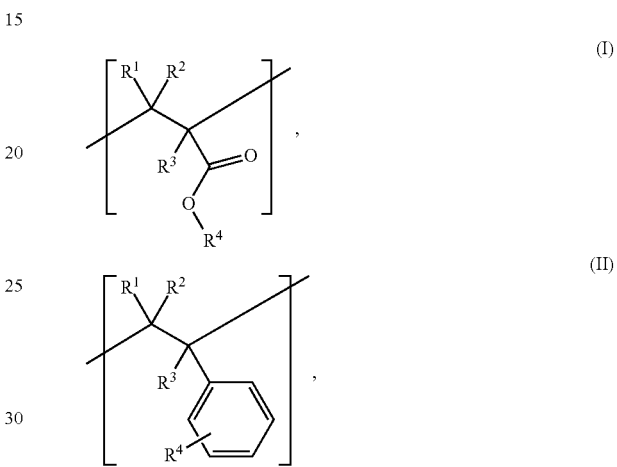

where $R^1$, $R^2$, $R^3$, and $R^4$ are each independently H or $C_{1-6}$ alkyl. For example, $R^1$ and $R^2$ may both be H, both $R^3$ and $R^4$ may be $C_{1-3}$ alkyl, or $R^1$ and $R^2$ may be both H and $R^3$ and $R^4$ may be both methyl.

In some embodiments, the molar weight of the non-ionic block combined with the ionic block of the copolymer is less than 40,000 g/mol.

Reference herein to the molar weight of a polymer is intended to mean that as determined by either gel permeation chromatography (GPC) or 1H NMR.

The block copolymer of the electrolyte composition of present invention also comprises an ionic block. By the expression "ionic block" is meant a polymer block that contains an overall ionic charge.

The monomer residues of the ionic block may derive from styrene or styrene derivatives, indene or indene derivatives, vinylpyridine or vinylpyridine derivatives, methyl methacrylate or methacrylate derivatives, methyl acrylate or acrylate derivatives, methacrylamide or acrylamide derivatives, or a combination thereof. In some embodiments, the monomer residues of the ionic block derive from α-methylstyrene, methylstyrene, chlorostyrene, hydroxystyrene, vinylbenzyl chloride, methylindene, ethylindene, trimethylindene, vinylmethylpyridine, vinylbutylpyridine, vinylquinioline, vinylacrydine, hydroxyethyl methacrylate, dimethylamino-ethyl methacrylate, vinylcarbazole, or a combination thereof.

The type of the pendant organic ionic liquid cation is not particularly limited provided it presents as a pendant moiety to the monomer residues forming the backbone of the ionic block.

In some embodiments, the pendant organic ionic liquid cation comprises any known ionic liquid cation type. The cation may be mono-, di-, or tri-substituted, typically alkyl substituted, where each alkyl independently defined to include $C_{1-8}$ linear, branched, or cyclic carbon moieties.

In some embodiments, the pendant organic ionic liquid cation comprises a carboalkoxy, carboxylato, carboxyamino, alkylene, alkenylene, or ether group linking the cation to the polymerised monomer residues of the ionic block.

In some embodiments, the ionic block comprises a repeating unit having the following structure (III):

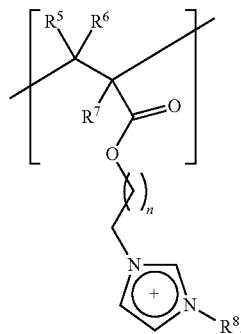

(III)

where $R^5$, $R^6$, $R^7$, and $R^8$ are each independently H or optionally substituted $C_{1-12}$ alkyl, and n has a value in a range from 0 to about 20, or from 0 to about 10, or from 0 to about 5. For example, $R^5$ and $R^6$ may be both H, $R^7$ and $R^8$ may be both $C_{1-6}$ alkyl, and/or $R^5$ and $R^6$ may be both H, $R^7$ may be methyl, and $R^8$ may be n-butyl, with n between 1 or about 10.

In some embodiments, the pendant organic ionic liquid cation comprises 1-butyl(propyl)-1-methylpyrrolidinium ($C_4C_3$mpyr), N-methyl-N-propylpyrrolidinium ($C_3$mpyr), N-butyl-N-methylpyrrolidinium ($C_4$mPyr), 1-ethyl-3-methylimidazolium ($C_2$mim), 1-propyl-3-methylimidazolium ($C_3$mim), 1-butyl-3-methylimidazolium ($C_4$mim), 1-hexyl-3-methylimidazolium ($C_6$mim), 1-octyl-3-methylimidazolium ($C_8$mim), 1-dodecyl-3-methylimidazolium ($C_{12}$mim), 1-hexadecyl-3-methylimidazolium ($C_{16}$mim), 1,2-dimethyl-3-butylimidazolium ($C_4(2-C_1)$mim), 1-(3-aminopropyl)-3-methylimidazolium ((3-aminopropyl)mim), 1,2-dimethyl-3-(3-hydroxypropyl)imidazolium (($C_2$—OH)), N-ethyl-tris(2-(2-methoxyethoxy)ethyl) ethane ammonium ($N_{2(2o2o1)3}$), Trihexyl(tetradecyl)phosphonium ($P_{66614}$), Diethyl(methyl)(isobutyl)phosphonium ($P_{122i4}$), Triisobutyl(methyl)phosphonium ($P_{1i4i4i4}$), Triethyl(methyl)phosphonium ($P_{1222}$), Trimethyl(isobutyl)phosphoinum ($P_{111i4}$), or a combination thereof.

In some embodiments, polymerised monomer residues of the ionic block derive from monomers that comprise a pendant organic ionic liquid cation of the kind described herein. There is no particular limitation as to the type of such monomers, provided they comprise a polymerizable moiety and a pendant organic ionic liquid cation. Examples of such monomers include acryloyl-imidazolium, acryloyl-pyrrolidinium, acryloyl-pyridinium, vinyl-imidazolium, vinyl-pyrrolidinium, vinyl-pyridinium, styrene-imidazolium, styrene-pyrrolidinium, styrene-pyridinium, and a combination thereof.

The pendant organic ionic liquid cation has a counter anion. Provided the counter anion neutralizes the charge of the pendant organic ionic liquid cation, there is no limitation as to the nature of that counter anion.

In some embodiments, the counter anion of the pendant organic ionic liquid cation is selected from alkyl phosphate, biscarbonate, bistriflimide ((i.e., $N(SO_2CF_3)_2$)), $N(SO_2C_2F_5)_2^-$, $N(SO_2CF_3)(SO_2C_4F_9)^-$, carbonate, chlorate, formate, glycolate, perchlorate, hexasubstituted phosphate (including $PF_6^-$, $PF_3(CF_3)_3^-$, $PF_3(C_2F_5)_3^-$), tetra-substituted borate (including e.g., $BF_4^-$, $B(CN)_4^-$, optionally fluorinated $C_{1-4}$ alkyl-$BF_3^-$ (including $BF_3(CH_3)^-$, $BF_3(CF_3)^-$, $BF_3(C_2H_5)^-$, $BF_3(C_2F_5)^-$, $BF_3(C_3F_7)^-$), tosylate, triflate, and a combination thereof.

In some preferred embodiments, the counter anion of the pendant organic ionic liquid cation is selected from bis(trifluoromethanesulfonyl)imide (TFSI), Triflate (OTf), Tetrafluoroborate ($BF_4$), hexafluorophosphate ($PF_6$), and bis(fluorosulfonyl)imide (FSI), fluorosulfonyl-(trifluoromethanesulfonyl)imide (FTFSI), and a combination thereof.

In addition to or instead of the pendant organic ionic liquid cation, the ionic block may comprise a pendant anionic moiety.

The nature of the pendant anionic moiety is not particularly limited provided it presents as a pendant moiety to the monomer residues forming the backbone of the ionic block.

In some embodiments, the pendant anionic moiety comprises derivatives of bis(trifluoromethanesulfonyl)imide (TFSI), Triflate (OTf), Tetrafluoroborate ($BF_4$), hexafluorophosphate ($PF_6$), and bis(fluorosulfonyl)imide (FSI), fluorosulfonyl-(trifluoromethanesulfonyl)imide (FTFSI) and a combination thereof.

The pendant anionic moiety has a counter cation.

In one embodiment, the polymerised monomer residues of the ionic block do not have covalently coupled thereto a pendant anionic moiety.

The block copolymer used according to the invention may be prepared by any suitable means.

In one embodiment, the block copolymer is prepared by a process comprising the polymerisation of ethylenically unsaturated monomers. The polymerisation of the ethylenically unsaturated monomers is preferably conducted using a living polymerisation technique.

Examples of living polymerisation include ionic polymerisation and controlled radical polymerisation (CRP). Examples of CRP include, but are not limited to, iniferter polymerisation, stable free radical mediated polymerisation (SFRP), atom transfer radical polymerisation (ATRP), and reversible addition fragmentation chain transfer (RAFT) polymerisation.

In one embodiment, the block copolymer is formed by polymerising ethylenically unsaturated monomer under the control of a living polymerisation agent, for example a RAFT agent.

RAFT agents suitable for use in accordance with the invention may be obtained commercially, for example see those described in the Sigma Aldrich catalogue (www.sigmaaldrich.com), or Boron Molecular catalogue (www.boronmolecular.com).

The electrolyte composition of the present invention also comprises an organic electrolyte. As used herein, the expression "organic electrolyte" refers to an organic substance which can conduct electricity by displacement of charged species (e.g. ions). The charged species, which may or may not be part of the organic electrolyte, may be cationic and/or anionic species (e.g. ions) either provided in solution with the substance or integral to the chemical structure of the substance (e.g. ionic liquids). By the electrolyte being "organic", the organic electrolyte comprises carbon.

In some embodiments, the organic electrolyte comprises an organic non-ionic polar compound. By the compound being "non-ionic", the chemical structure of the compound does not comprise ionic bonds. By the compound being "polar", the constituting molecules of the compound present asymmetrical charge distribution resulting in positive and negative charge domains. Accordingly, in those instances the organic electrolyte acts as a vehicle for ion diffusion.

When the organic electrolyte comprises an organic non-ionic polar compound, electrolyte behaviour may derive at least from lithium cations provided by the lithium salt of the electrolyte composition. In addition, ionic species provided by the ionic block of the block copolymer may also contribute to the electrolyte functionality of the organic electrolyte.

Examples of suitable organic non-ionic polar compounds include linear ethers, cyclic ethers, esters, carbonates, lactones, nitriles, amides, sulfones, sulfolanes, diethylether, dimethoxyethane, tetrahydrofuran, dioxane, dioxolane, methyltetrahydrofuran, methyl formate, ethyl formate, methyl propionate, propylene carbonate, ethylene carbonate, dimethyl carbonate, diethyl carbonate, ethylmethyl carbonate, dibutyl carbonate, butyrolactones, acetonitrile, benzonitrile, nitromethane, nitrobenzene, dimethylformamide, N-methylpyrolidone, dimethylsulfone, tetramethylene sulfone, sulfolane, thiophene, and a combination thereof.

In some embodiments, the organic electrolyte is an organic ionic liquid. More specifically, in some embodiments the organic electrolyte is an organic ionic liquid not covalently coupled to the block copolymer. By the organic ionic liquid being "not covalently coupled to the block copolymer" is meant that the organic ionic liquid is provided in the electrolyte composition as a component that is not attached to the block copolymer by a covalent bond. In other words, that organic ionic liquid is free from the copolymer in the composition.

The organic ionic liquid not covalently coupled to the block copolymer has a cation and a counter anion. It was surprisingly observed that the type of the cation of the organic ionic liquid not covalently coupled to the block copolymer is in itself an effective parameter that can be modified to assist with the ionic conductivity of the electrolyte compositions while maintaining their good mechanical stability. In particular, it has been observed that improved properties can result when the cation of the uncoupled organic liquid is selected from an ammonium cation, a pyridinium cation, a pyrrolidinium cation, and a phosphonium cation.

Examples of suitable forms of these cations include 1-butyl(propyl)-1-methylpyrrolidinium ($C_4C_3$mpyr), N-methyl-N-propylpyrrolidinium ($C_3$mpyr), N-butyl-N-methylpyrrolidinium ($C_4$mPyr), N-ethyl-tris(2-(2-methoxyethoxy)ethyl) ethane ammonium ($N_{2(2o2o1)3}$), Trihexyl(tetradecyl)phosphonium ($P_{66614}$), Diethyl(methyl)(isobutyl)phosphonium ($P_{122i4}$), Triisobutyl(methyl)phosphonium ($P_{1i4i4i4}$), Triethyl(methyl)phosphonium ($P_{1222}$), Trimethyl(isobutyl)phosphoinum ($P_{111i4}$), or a combination thereof.

The organic ionic liquid not covalently coupled to the block copolymer comprises a counter anion. Provided the counter anion neutralizes the charge of the organic ionic liquid cation, there is no limitation as to the type of the counter anion.

In some embodiments, the organic ionic liquid not covalently coupled to the block copolymer comprises a counter anion selected from aqueous or anhydrous alkyl phosphate, biscarbonate, bistriflimide (i.e., $N(SO_2CF_3)_2^-$), $N(SO_2C_2F_5)_2^-$, $N(SO_2CF_3)(SO_2C_4F_9)^-$, carbonate, chlorate, formate, glycolate, perchlorate, hexasubstituted phosphate (including $PF_6^-$, $PF_3(CF_3)_3^-$, $PF_3(C_2F_5)_3^-$); tetra-substituted borate (including e.g., $BF_4^-$, $B(CN)_4^-$, optionally fluorinated $C_{1-4}$ alkyl-$BF_3^-$ (including $BF_3(CH_3)^-$, $BF_3(CF_3)^-$, $BF_3(C_2H_5)^-$, $BF_3(C_2F_5)$, $BF_3(C_3F_7)$), tosylate, triflate, and a combination thereof.

In some preferred embodiments, the organic ionic liquid not covalently coupled to the block copolymer comprises a counter anion selected from bis(trifluoromethanesulfonyl)imide (TFSI), Triflate (OTf), Tetrafluoroborate ($BF_4$), hexafluorophosphate ($PF_6$), and bis(fluorosulfonyl)imide (FSI), fluorosulfonyl-(trifluoromethanesulfonyl)imide (FTFSI), and a combination thereof.

The electrolyte composition of the present invention also comprises a lithium salt.

There is no particular limitation as to the type of the lithium salt that may be used, provided that salt is chemically compatible with the other components of the composition. In some embodiments, the lithium salt is selected from lithium bis(tri-fluoromethane)sulfonimide (Li-TFSI), lithium (bis(fluorosulfonyl)imide (Li-FSI), lithium fluorosulfonyl-(trifluoromethanesulfonyl) imide (Li-FTFSI), lithium triflate (LiOTf), lithium perchlorate (LiClO$_4$), lithium tetrafluoroborate (LiBF$_4$), lithium hexafluorophosphate (LiPF$_6$), and a combination thereof.

Surprisingly, the number of glass transition (Tg) values (as measured by DSC) observed for the electrolyte composition has in itself been found to be an effective parameter that, independently from other parameters described herein, is indicative of the composition mechanical stability and ionic conductivity. In particular, it has been found that electrolyte compositions according to the invention that have at least two Tg values as measured by DSC exhibit an excellent balance between mechanical stability and ionic conductivity.

The "Tg" is a temperature value representative of a temperature or temperature range over which an amorphous polymeric composition (or the amorphous regions in a partially crystalline polymeric composition) changes from a relatively hard and brittle state to a relatively viscous or rubbery state.

In the context of the present invention the number of Tg values for a given composition is determined by DSC. A skilled person would be aware of procedures for the determination of the number of Tg values of a sample based on DSC characterisation. For example, a Tg value of a composition may be defined by a stepwise increase of the heat capacity as a function of temperature. Presence of a Tg value is determined by either the onset temperature (i.e. start point or end point) or inflection point (i.e. mid-point). A skilled person would know how to analyse such curve and identify the number of discontinuities corresponding to the number of Tg values.

As used herein, the Tg of the "composition" is intended to mean that obtained by DSC analysis performed on the composition per se (i.e. including the copolymer, lithium salt and the organic electrolyte). It is nevertheless believed the measured Tg of the composition reflects the Tg of the copolymer in that composition. The Tg profile of the composition may however differ from the Tg profile of the copolymer due to possible plasticising effects on the copolymer deriving from the lithium salt and/or the organic electrolyte present in the composition in addition to the copolymer.

The electrolyte composition has at least two Tg values. This is a surprising and very favourable characteristic as lithium salt and a organic electrolyte (e.g. an ionic liquid) in the composition have in the past been known to cause a plasticising effect on the copolymer that can thus alter the number of Tg values of the copolymer when measured by DSC. In other words, micro-phase separation disappears or diminishes and only a single Tg is measured in many currently made electrolyte compositions.

The presence of at least two Tg values of the electrolyte composition is believed to indicate the morphology of the composition is characterised by strong micro-phase separation, and that such separation is beneficial to both the ionic conductivity and the mechanical properties of the composition. Without wanting to be confined by theory, it is believed strong micro-phase separation provides preferential pathways for ionic diffusion, thus promoting ionic conductivity. On the other hand, it is believed that such separation emphasises the composite-like character of the composition, thus improving its overall mechanical properties.

As used herein the expression "micro-phase separation" of the composition is intended to mean the presence or formation of nanometer-sized structures derived from the spatial self-assembly of the composition constituents. Without being confined to theory, such self-assembled structures are believed to form a periodic nanostructured lamellar morphology with connected ion-conducting domains.

Where the electrolyte composition presents micro-phase separation at least one region of nanophase separation may be characterized by a periodic nanostructured lamellar, hexagonal, 3D continuous or discontinuous morphology. Those domains may extend in one-, two- or three-dimensions throughout the composition. The periodicity of the nanostructured morphology may be characterized by ordered domains having lattice parameter dimensions in the range of about 1 nm to about 500 nm, as measured by small angle X-ray scattering (SAXS).

The Tg of the electrolyte composition associated with the non-ionic block of the copolymer is not limited to any specific value. For example, Tg of the electrolyte composition associated with the non-ionic block may be between about 30° C. and about 250° C., between about 30° C. and about 200° C., between about 30° C. and about 175° C., between about 30° C. and about 150° C., between about 30° C. and about 125° C., between about 30° C. and about 100° C., between about 40° C. and about 100° C., between about 50° C. and about 100° C., between about 60° C. and about 100° C., or between about 70° C. and about 100° C.

Similarly, the Tg of the electrolyte composition associated with the ionic block of the copolymer is not limited to any specific value. For example, Tg of the electrolyte composition associated with the ionic block may be between about −100° C. and about 50° C., between, between about −100° C. and about 20° C., between about −100° C. and about 0° C., between about −100° C. and about −30° C., between about −100° C. and about −70° C., or between about −100° C. and about −90° C.

Provided the electrolyte composition has at least two glass transition temperature (Tg) values as measured by Differential Scanning Calorimetry (DSC), the ionic block, lithium species and organic electrolyte may be provided in any relative amount.

In some embodiments, the (organic electrolyte:ionic block) molar fraction is between about 0.01 and about 1, between about 0.01 and about 0.9, between about 0.01 and about 0.8, between about 0.01 and about 0.7, between about 0.01 and about 0.6, between about 0.01 and about 0.5, between about 0.01 and about 0.4, between about 0.01 and about 0.3, between about 0.01 and about 0.2, between about 0.01 and about 0.1, or between about 0.01 and about 0.05. For example, the (organic electrolyte:ionic block) molar fraction may be 0.39.

In some embodiments, the (lithium:ionic block) molar fraction is between about 0.01 and about 15, between about 0.01 and about 12.5, between about 0.01 and about 10, between about 0.01 and about 7.5, between about 0.01 and about 5, between about 0.01 and about 2.5, between about 0.01 and about 1, between about 0.01 and about 0.75, between about 0.01 and about 0.5, between about 0.01 and about 0.1, between about 0.01 and about 0.075, between about 0.01 and about 0.05, or between about 0.01 and about 0.02. For example, the (lithium:ionic block) molar fraction may be selected from 0.00, 0.58, 3.00, and 5.81.

In some embodiments, the (ionic block:lithium:organic electrolyte) molar ratio is selected from 1.00:0.00:0.33, 1.00:0.00:0.39, 1.00:0.00:0.74, 1.00:0.20:0.21, 1.00:0.46:0.47, 1.00:0.58:0.39, 1.00:1.00:0.00, 1.00:1.01:0.14, 1.00:3.00:0.39, 1.00:5.81:0.00, 1:00:5.81:0.39, 1.00:5.81:0.79, 1.00:5.81:2.36, and 1.00:8.72:1.57.

Accordingly, when the organic electrolyte comprises organic ionic liquid not covalently coupled to the block copolymer (i.e. free ionic liquid), the ionic block, lithium species and free ionic liquid may be provided in any relative amount provided the electrolyte composition has at least two glass transition temperature (Tg) values as measured by Differential Scanning Calorimetry (DSC).

In some embodiments, the (free ionic liquid:ionic block) molar fraction is between about 0.01 and about 1, between about 0.01 and about 0.9, between about 0.01 and about 0.8, between about 0.01 and about 0.7, between about 0.01 and about 0.6, between about 0.01 and about 0.5, between about 0.01 and about 0.4, between about 0.01 and about 0.3, between about 0.01 and about 0.2, between about 0.01 and about 0.1, or between about 0.01 and about 0.05. For example, the (free ionic liquid:ionic block) molar fraction may be 0.39.

In some embodiments, the (lithium:ionic block) molar fraction is between about 0.01 and about 15, between about 0.01 and about 12.5, between about 0.01 and about 10, between about 0.01 and about 7.5, between about 0.01 and about 5, between about 0.01 and about 2.5, between about 0.01 and about 1, between about 0.01 and about 0.75, between about 0.01 and about 0.5, between about 0.01 and about 0.1, between about 0.01 and about 0.075, between about 0.01 and about 0.05, or between about 0.01 and about 0.02. For example, the (lithium:ionic block) molar fraction may be selected from 0.00, 0.58, 3.00, and 5.81.

In some embodiments, the (ionic block:lithium:free ionic liquid) molar ratio is selected from 1.00:0.00:0.33, 1.00:0.00:0.39, 1.00:0.00:0.74, 1.00:0.20:0.21, 1.00:0.46:0.47, 1.00:0.58:0.39, 1.00:1.00:0.00, 1.00:1.01:0.14, 1.00:3.00:0.39, 1.00:5.81:0.00, 1:00:5.81:0.39, 1.00:5.81:0.79, 1.00:5.81:2.36, and 1.00:8.72:1.57.

It was also surprisingly observed that the molar weight of the ionic blocks combined with the non-ionic blocks of the copolymer is in itself an effective parameter that can be tuned to assist with the mechanical stability of the electrolyte compositions while maintaining their good ionic conductivity. In particular, in some embodiments it can be advantageous if the molar weight of the ionic blocks combined with the non-ionic blocks of the copolymer is less than about 40,000 g/mol.

Accordingly, in some embodiments the molar weight of the non-ionic block combined with the ionic block is less than about 40,000 g/mol. For example, the total molar weight of the non-ionic block and the ionic block may be between about 100 g/mol and about 40,000 g/mol, between about 500 g/mol and about 40,000 g/mol, between about 1,000 g/mol and about 40,000 g/mol, between about 2,500 g/mol and about 40,000 g/mol, between about 5,000 g/mol and about 40,000 g/mol, or between about 10,000 g/mol and about 40,000 g/mol.

It was also surprisingly observed that the amount of organic electrolyte is in itself an effective parameter that can be modified to assist with the ionic conductivity of the electrolyte compositions while maintaining good mechanical stability. In particular, it can be particularly advantageous to have compositions in which the organic electrolyte is present in an amount of less than 55 wt. % relative to the total weight of the electrolyte composition.

Accordingly, in some embodiments the organic electrolyte is present in an amount of less than 55 wt. % relative to the total weight of the electrolyte composition.

Without wishing to be confined by theory, an amount of organic electrolyte of less than 55 wt. % relative to the total weight of the composition is believed to ensure that its plasticising effect is minimal, yet it allows for dissolution of a high amount of lithium salt. That in turn is believed to provide for a good balance between high ionic conductivity and mechanical stability of the electrolyte composition.

In some embodiments, the organic electrolyte in the electrolyte composition is present in an amount of between about 0.1 wt. % and about 50 wt. %, between about 0.1 wt. % and about 40 wt. %, between about 0.1 wt. % and about 20 wt. %, between about 0.1 wt. % and about 5 wt. %, relative to the total weight of the electrolyte composition.

Accordingly, when the organic electrolyte comprises organic ionic liquid not covalently coupled to the block copolymer, the amount of organic ionic liquid not covalently coupled to the block copolymer is in itself an effective parameter that can be modified to assist with the ionic conductivity of the electrolyte compositions while maintaining good mechanical stability. In particular, it can be particularly advantageous to have compositions in which the organic ionic liquid not covalently coupled to the block copolymer is present in an amount of less than 55 wt. % relative to the total weight of the electrolyte composition.

Accordingly, in some embodiments the organic ionic liquid not covalently coupled to the block copolymer is present in an amount of less than 55 wt. % relative to the total weight of the electrolyte composition.

Without wishing to be confined by theory, an amount of uncoupled ionic liquid of less than 55 wt. % relative to the total weight of the composition is believed to ensure that its plasticising effect is minimal, yet it allows for dissolution of a high amount of lithium salt. That in turn is believed to provide for a good balance between high ionic conductivity and mechanical stability of the electrolyte composition.

In some embodiments, the organic ionic liquid not covalently coupled to the block copolymer in the electrolyte composition is present in an amount of between about 0.1 wt. % and about 50 wt. %, between about 0.1 wt. % and about 40 wt. %, between about 0.1 wt. % and about 20 wt. %, between about 0.1 wt. % and about 5 wt. %, relative to the total weight of the electrolyte composition.

It was also surprisingly observed the amount of lithium salt is in itself an effective parameter that can be to assist with the ionic conductivity and lithium transport properties of the electrolyte compositions of the present invention while maintaining their good mechanical stability. In particular, it has been found advantageous to have electrolyte compositions in which the weight percent of the lithium salt in the electrolyte composition is at least 11.

Accordingly, in some embodiments the lithium salt is present in an amount of at least 11 wt. % relative to the total weight of the electrolyte composition. For example, the amount of lithium salt may be between about 11 wt. % and about 80 wt. %, between about 11 and 70 wt. % and between about 11 and 60, or between 11 and 55 wt. % relative to the total weight of the electrolyte composition.

Without wishing to be confined by theory, when at least 11 weight percent of lithium salt in the electrolyte composition is used, it is believed the ionic conductivity and lithium transport properties of the composition can be improved together with its mechanical stability because the amount of uncoupled ionic liquid, and consequently its plasticising effect, can be minimised.

The present invention also provides a lithium-based electrochemical cell, which comprises an electrolyte composition of the kind described herein. In particular, the present invention provides a lithium-based electrochemical cell comprising a negative electrode and an electrolyte composition as described herein.

The negative electrode may comprise (or be made of), expanded graphite, hard carbon (non-graphitisable carbon), coke, carbon black and glassy carbon.

In some embodiments, the lithium-based electrochemical cell of the invention supports a current density at the negative electrode of at least 10 $\mu$A/cm$^2$, up to a maximum of 2,500 $\mu$A/cm$^2$.

The lithium based electrochemical cell according to the invention may be configured and used such that electric current flows through the negative electrode along opposite directions in a cyclical manner. This may be achieved by subjecting the cell to polarisation cycles, in which electric current of a certain density flows through the negative electrode along alternating opposite directions. As a result, an electric potential of alternating sign can be observed.

In that context, a single polarisation cycle is intended to mean a two-step cycle comprising: step 1 in which electric current of a certain density flows through the negative electrode along an initial direction; and step 2 in which the electric current is switched to flow through the negative electrode along the direction opposite to the initial direction.

In some embodiments, the cell according to the invention can advantageously undergo such polarisation cycles while still maintaining a current density at the negative electrode of at least 10 $\mu$A/cm$^2$. As a skilled person would understand, a cell undergoing polarisation cycles at a certain current density may also be referred to as being capable of "sustaining" such current density.

In other embodiments, when the lithium-based electrochemical cell is in use electric current flows through the negative electrode along opposite directions in a cyclical manner as a result of the cell undergoing a charge/discharge cycle. A skilled person will know the technical meaning of the expression "charge/discharge cycle", and how to perform such procedure.

For example, a charge/discharge cycle may be the charge/discharge performed to activate a rechargeable battery following assembly. As a skilled person would know, this refers to the procedure adopted to form/activate a negative electrode by way of charging/discharging routines under controlled voltage, temperature and environmental conditions, which is performed with the intention of inducing formation of the solid-electrolyte interphase (SEI) layer at the negative electrode.

Accordingly, in some embodiments the lithium-based electrochemical cell of the invention, when undergoing a charge/discharge cycle, has a current density at the negative electrode of at least 10 µA/cm².

In some embodiments, the lithium-based electrochemical cell of the invention, when undergoing a charge/discharge cycle, has a current density at the negative electrode of at least 10 µA/cm² for at least 10 charge/discharge cycles, or of at least 10 µA/cm² for at least 20 charge/discharge cycles, or of at least 10 µA/cm² for at least 50 charge/discharge cycles, or of at least 10 µA/cm² for at least 100 charge/discharge cycles, or of at least 10 µA/cm² for at least 500 charge/discharge cycles, or of at least 10 µA/cm² for at least 1,000 charge/discharge cycles.

In some embodiments, the lithium-based electrochemical cell of the invention comprises a positive electrode. As used herein, and as a person skilled in the art would know, the expression "positive electrode" refers to the electrode at which electrons enter the cell during discharge. By reference to its functionality during discharge, the positive electrode is also commonly referred to in the art as a "cathode".

Examples of material which the positive electrode may comprise (or be made of) include an oxide of a lithiated transition metal such as $LiCoO_2$, $LiNiO_2$, $LiMnO_2$, $LiMn_2O_4$, $LiFePO_4$, and corresponding substitutes in which a part of the main metal is substituted by one or more other transition metals such as Co, Mn, Al, Mg, Ti. The positive electrode may also comprise (or be made of) a carbon based-sulphur composite or carbon porous material for Li/sulphur and Li/air (or oxygen) battery, respectively.

A lithium-based electrochemical cell of the invention, when in a full-cell configuration, may also support a current density at the negative electrode having values described herein.

A lithium-based electrochemical cell of the invention, when in a full-cell configuration and undergoing polarisation or charge/discharge cycles as described herein, may also support a current density at the negative electrode having values described herein.

A full-cell configuration the cell of the invention can advantageously find application as an energy storage device, for example as a lithium-based rechargeable battery. The specific current density that the cell of the invention supports advantageously provides for a lithium rechargeable battery with high discharge capacity and supporting multiple charge-discharge cycles.

Accordingly, the present invention also provides a lithium-based rechargeable battery comprising a negative electrode, a positive electrode and an electrolyte composition as described herein.

Specific embodiments of the invention will now be described with reference to the following non-limiting examples.

EXAMPLES

Example 1

Synthesis protocol for poly(styrene-b-1-((2-acryloyloxy)ethyl)-3-butylimidazolium bis(trifluoromethanesulfonyl)imide) with Two Different Molecular Weights, Corresponding to Different Degrees of Polymerization (DP) (64 and 16) (S-ImTFSI (64-16))

S-ImTFSI (64-16) was synthesized on a large scale using a method derived from the one described by Jae-Hong Choi et al. "Network Structure and Strong Microphase Separation for High Ion Conductivity in Polymerized Ionic Liquid Block Copolymers", *Macromolecules* 2013, Volume 46, pages 5290-5300, which content is incorporated herein in its entirety. For the purposes of the present application that method was modified as follows: a) Polystyrene-macroRAFT was synthesized in refluxing toluene to a targeted conversion; b) Chain extension with bromoethylacrylate was performed in refluxing ethyl acetate using Vazo 88 as an initiator over 68 h; and c) 3.54 equivalents of LiTFSI (instead of 5 equivalents) was used for anion exchange from bromide to TFSI. The molecular weight of the final polymer (S-ImTFSI) was determined by 1H NMR. The number of repeating units in the first block was determined by the conversion obtained during polymerisation, while the number of repeating units in the second block was determined by comparing assigned signals of the two blocks in the block copolymer. The polymer's molecular weight, excluding the RAFT moiety, was calculated by adding for each block, the number of repeating units multiplied by the molecular weight of each unit.

Preparation of Electrolyte Composition Containing S-ImTFSI, Lithium Salt and Ionic Liquid Because of the hygroscopic nature of the lithium bis(fluorosulfonyl)imide salt (LiFSI) and the high LiFSI content (≥11.00 wt. %) of the synthesized polymer electrolytes, argon gloveboxes were used for polymer casting and storage. The polymer electrolytes were made using a solvent casting method. The desired amount by weight of LiFSI, S-ImTFSI (64-16) and N-propyl-N-methylpyrrolidinium bis(fluorosulfonyl)imide ionic liquid ($C_3$mpyrFSI) were dissolved in tetrahydrofuran (THF). Polymer thickness was controlled by altering the concentration of the THF solution used. The polymer electrolytes were cast on a Teflon mould. The polymer electrolytes were first dried at 50° C. using the argon glovebox antechamber for 24 hours and then further dried at 80° C. under high vacuum using a Schlenk line.

The lithium salt and organic ionic liquid concentrations are herein expressed in terms of the molar ratio of the lithium ions and ionic liquid cations, respectively, to the polymerized ionic liquids moieties using the general notation "S-ImTFSI (DP of S block DP of ImTFSI); (Li/ImTFSI=XX; $C_3$mpyrFSI/ImTFSI=XX). For example, S-ImTFSI (64-16) (Li/ImTFSI=5.81; $C_3$mpyrFSI/ImTFSI=0.39). For these calculations, RAFT end groups are not included in the molar weight of the S-ImTFSI (DPof S block DP of ImTFSI) calculations.

Table 1 lists the samples obtained by using the procedure described above, together with corresponding compositions. LiFSI weight calculation is performed with the following formula: $Mass_{LiFSI}=(Li_{cat}/Poly_{cat}$ molar ratio*$(DP_{ImTFSI}*(1/M_{S-ImTFSI\ (DP\ of\ S\ block-DP\ of\ ImTFSI)}))*M_{LiFSI})$. $C_3$mpyrFSI weight calculation is performed with the following formula: $Mass_{C3mpyrFSI}=(C_3mpyr_{cat}/Poly_{cat}$ molar ratio*$(DP_{ImTFSI}*(1/M_{S-ImTFSI\ (DP\ of\ S\ block-DP\ of\ ImTFSI)}))*M_{C3mpyrFSI})$. LiFSI weight percent calculation is performed with the following formula: LiFSI wt. %=$((Mass_{LiFSI})/(1+Mass_{LiFSI}+Mass_{C3mpyrFSI}))$. $C_3$mpyrFSI weight percent calculation is performed with the following formula: $C_3$mpyrFSI wt. %=$((Mass_{C3mpyrFSI})/(1+Mass_{LiFSI}+Mass_{C3mpyrFSI}))$.

TABLE 1

List of samples prepared

| Composite component | Block copolymer used | Molar ratio $poly_{cat}$:$Li_{cat}$:$IL_{cat}$ |
|---|---|---|
| Block copolymer | S-ImTFSI (64-16) | N/A |
|  | S-ImTFSI | N/A |

TABLE 1-continued

List of samples prepared

| Composite component | Block copolymer used | Molar ratio $poly_{cat}:Li_{cat}:IL_{cat}$ |
|---|---|---|
| | S-ImTFSI (127-20) | |
| | S-ImTFSI (127-31) | N/A |
| | S-ImTFSI (127-73) | N/A |
| Block copolymer + $C_3$mpyrFSI | S-ImTFSI (64-16) | 1.00:0.00:0.33 |
| | S-ImTFSI (64-16) | 1.00:0.00:0.39 |
| | S-ImTFSI (64-16) | 1.00:0.00:0.74 |
| Block copolymer + LiFSI | S-ImTFSI (64-16) | 1.00:1.00:0.00 |
| | S-ImTFSI (64-16) | 1.00:5.81:0.00 |
| Block copolymer + $C_3$mpyrFSI + LiFSI | S-ImTFSI (64-16) | 1.00:0.20:0.21 |
| | S-ImTFSI (64-16) | 1.00:0.46:0.47 |
| | S-ImTFSI (64-16) | 1.00:1.01:0.14 |
| | S-ImTFSI (64-16) | 1.00:0.58:0.39 |
| | S-ImTFSI (64-16) | 1.00:3.00:0.39 |
| | S-ImTFSI (64-16) | 1.00:5.81:0.39 |
| | S-ImTFSI (127-20) | 1.00:5.81:0.39 |
| | S-ImTFSI (127-20) | 1.00:5.81:0.79 |
| | S-ImTFSI (127-20) | 1.00:5.81:2.36 |
| | S-ImTFSI (127-20) | 1.00:8.72:1.57 |
| | S-ImTFSI (127-31) | 1.00:5.81:0.39 |
| | S-ImTFSI (127-73) | 1.00:5.81:0.39 |

Example 2

Thermal Characterization of S-ImTFSI Containing Lithium Salt and Organic Ionic Liquid The phase behavior and ionic conductivity of the samples were also assessed by differential scanning calorimetry (DSC) and electrochemical impedance spectroscopy (EIS). The results are summarized in Table 2 and Table 3. The data shown in Table 2 show that two Tg are observed for all tested samples, deriving from the Tg of the PIL phase and that of the styrene phase for all compositions. The data suggests strong micro-phase separation. DSC results also confirm that lithium salts and organic ionic liquids are confined to PIL phase for all compositions, where they may provide some plasticizing effect. The highest $Li_{cat}/Poly_{cat}$ molar ratio investigated in this study is 8.72. Notably, that value of molar ratio does not correspond to the saturation limit.

TABLE 2

Thermal characteristics of prepared samples

| Block copolymer | Molar ratio $poly_{cat}:Li_{cat}:IL_{cat}$ | $T_{g\,PIL}$ (° C.) (end point) | $T_{g\,S}$ (° C.) (end point) |
|---|---|---|---|
| S-ImTFSI (64-16) | N/A | 8.3 | 93.6 |
| S-ImTFSI (127-20) | N/A | 12.5 | 101.3 |
| S-ImTFSI (127-31) | N/A | Not measured | Not measured |
| S-ImTFSI (127-73) | N/A | 6.4 | 105.7 |
| S-ImTFSI (64-16) | 1.00:0.00:0.33 | −16.9 | 91.7 |
| S-ImTFSI (64-16) | 1.00:0.00:0.39 | −21.37 | 90.2 |
| S-ImTFSI (64-16) | 1.00:0.00:0.74 | −33.2 | 91.5 |
| S-ImTFSI (64-16) | 1.00:1.00:0.00 | 2.7 | 92.8 |
| S-ImTFSI (64-16) | 1.00:5.81:0.00 | −23.5 | 92.1 |
| S-ImTFSI (64-16) | 1.00:0.20:0.21 | −6.9 | 91.3 |
| S-ImTFSI (64-16) | 1.00:0.46:0.47 | −21.1 | 91.6 |
| S-ImTFSI (64-16) | 1.00:1.01:0.14 | −7.5 | 92.2 |
| S-ImTFSI (64-16) | 1.00:0.58:0.39 | −17.7 | 90.1 |
| S-ImTFSI (64-16) | 1.00:3.00:0.39 | −26.0 | 91.6 |
| S-ImTFSI (64-16) | 1.00:5.81:0.39 | −29.7 | 91.7 |
| S-ImTFSI (127-20) | 1.00:5.81:0.39 | −19.5 | 108.2 |
| S-ImTFSI (127-20) | 1.00:5.81:0.79 | −30.8 | 104.4 |
| S-ImTFSI (127-20) | 1.00:5.81:2.36 | Not measured | Not measured |
| S-ImTFSI (127-20) | 1.00: 8.72:1.57 | −34.8 | 107.9 |
| S-ImTFSI (127-31) | 1.00:5.81:0.39 | −19.4 | 107.5 |
| S-ImTFSI (127-73) | 1.00:5.81:0.39 | −16.0 | 107.1 |

In S-ImTFSI (64-16) composite systems the $T_{g\,PIL}$ value for the S-ImTFSI (64-16) is 8.3° C. When $C_3$mpyrFSI is added to S-ImTFSI (64-16) at a molar ratio of 0.73, the resultant $T_{g\,PIL}$ decreases to −33.2° C., while in the lithium doped S-ImTFSI (64-16) at a molar ratio of 1, the resultant $T_{g\,PIL}$ is equal to 2.7° C. $C_3$mpyrFSI has a more significant plasticizing effect than LiFSI on the PIL phase. These trends are also observed when a mixture of LiFSI and $C_3$mpyrFSI is added to S-ImTFSI (64-16).

Example 3

Figure 2:
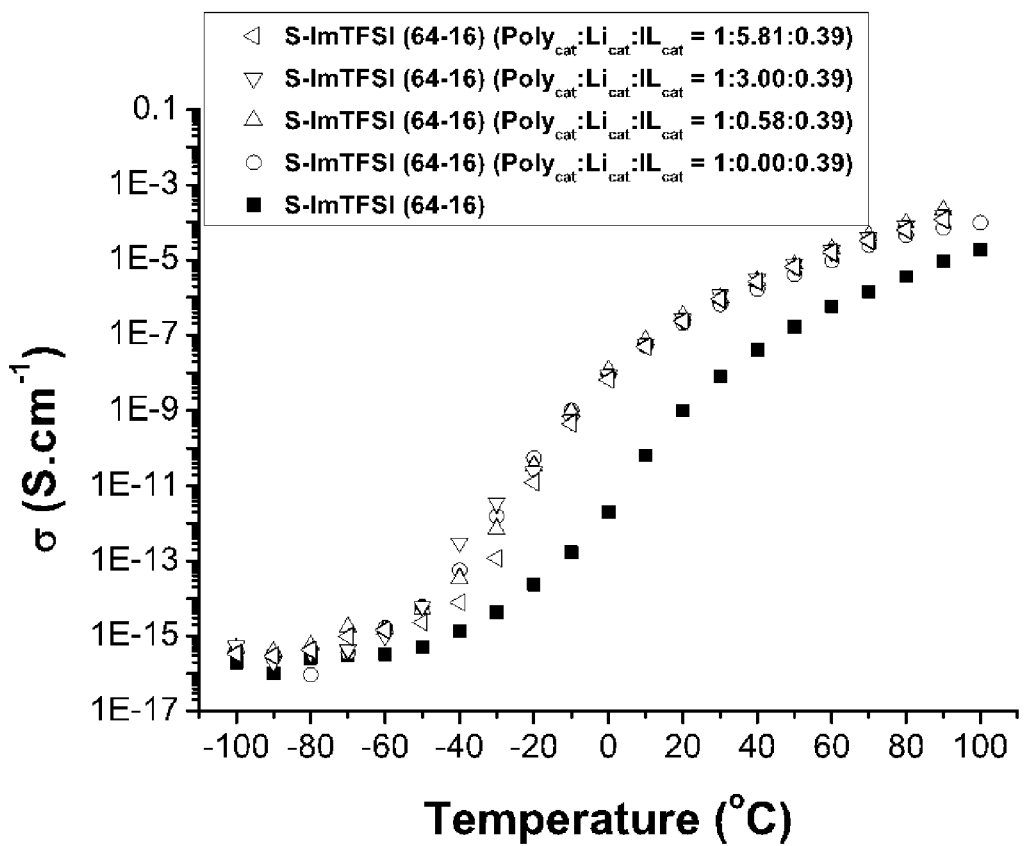
FIG. 2 shows ionic conductivity values for S-ImTFSI (64-16) block copolymers with various $Li_{cat}/poly_{cat}$ molar ratio and a fixed $IL_{cat}/poly_{cat}$ molar ratio of 0.39 as well as S-ImTFSI (64-16), at a temperature range of −100 to 100° C.
Figure 3:
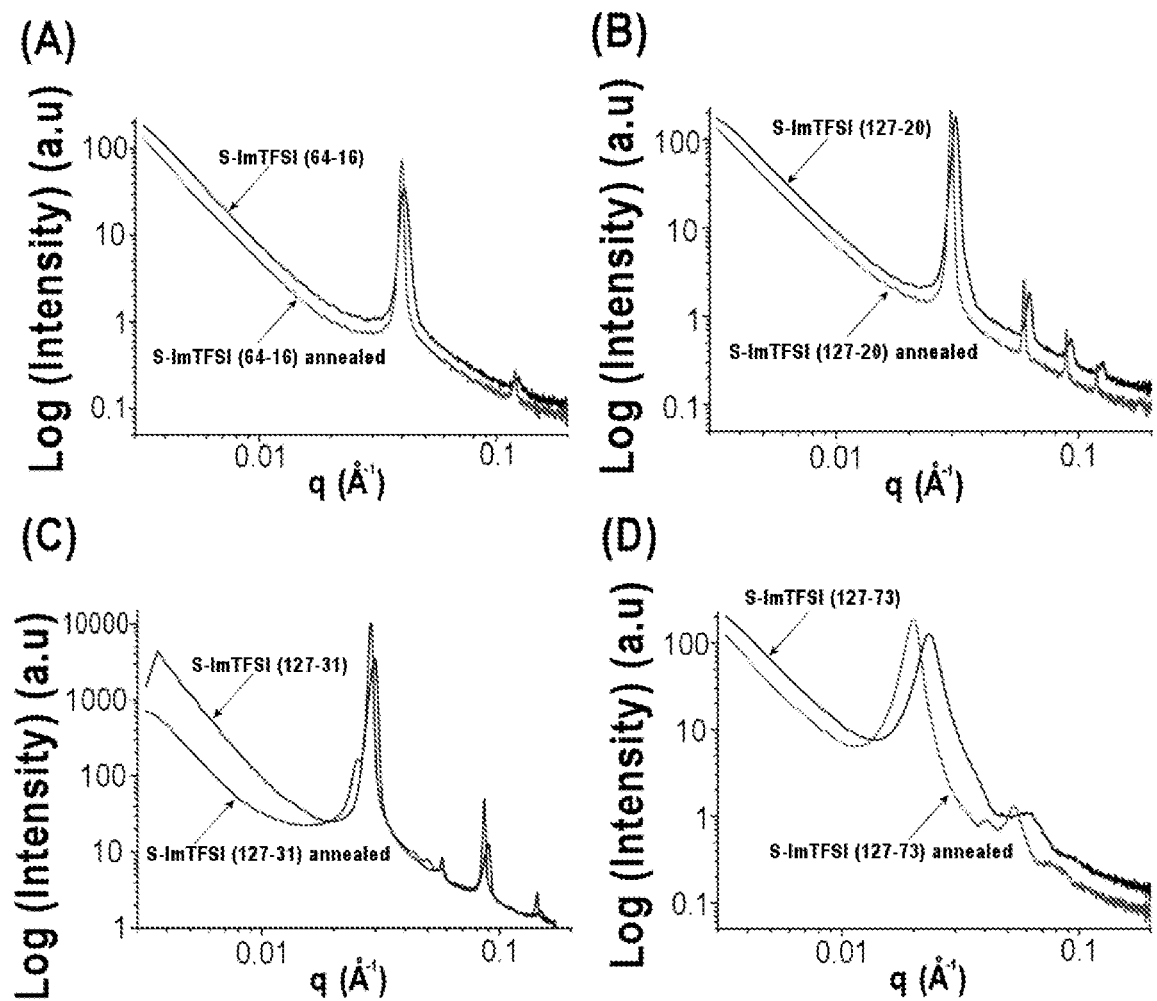
FIG. 3 Small Angle X-ray Scattering (SAXS) profiles at room temperature of the S-ImTFSI block copolymers with different styrene DP and PIL DP, with and without annealing treatment.

Ionic Conductivity of S-ImTFSI Copolymer Containing Lithium Salt and Organic Ionic Liquid FIG. 2 shows ionic conductivity values for S-ImTFSI (64-16) polymer samples with various $Li_{cat}/poly_{cat}$ molar ratio and a fixed $IL_{cat}/poly_{cat}$ molar ratio of 0.39, as well as S-ImTFSI (64-16), at a temperature range of 30-100° C. While the addition of $C_3$mpyrFSI to a molar ratio of 0.39 significantly increases ionic conductivity (e.g. $1.68E^{-7}$ vs. $4.05E^{-6}$ S·cm$^{-1}$ at 50° C.), subsequent LiFSI addition have little to no effect on ionic conductivity. Measured values of ionic conductivity for all tested samples are shown in Table 3, below.

TABLE 3

Ionic conductivity of prepared samples

| Block Copolymer | Molar ratio $poly_{cat}:Li_{cat}:IL_{cat}$ | Ionic conductivity (S·cm$^{-1}$) At 50° C./90° C. |
|---|---|---|
| S-ImTFSI (64-16) | N/A | 1.68E$^{-7}$/9.2E$^{-6}$ |
| S-ImTFSI (127-20) | N/A | Not measured |
| S-ImTFSI (127-31) | N/A | Not measured |
| S-ImTFSI (127-73) | N/A | Not measured |
| S-ImTFSI (64-16) | 1.00:0.00:0.33 | Not measured |
| S-ImTFSI (64-16) | 1.00:0.00:0.39 | 4.05E$^{-6}$/6.98E$^{-5}$ |
| S-ImTFSI (64-16) | 1.00:0.00:0.74 | Not measured |
| S-ImTFSI (64-16) | 1.00:1.00:0.00 | Not measured |
| S-ImTFSI (64-16) | 1.00:5.81:0.00 | Not measured |
| S-ImTFSI (64-16) | 1.00:0.20:0.21 | 6.0E$^{-6}$/8.6E$^{-5}$ |
| S-ImTFSI (64-16) | 1.00:0.46:0.47 | 1.0E$^{-5}$/1.8E$^{-4}$ |
| S-ImTFSI (64-16) | 1.00:1.01:0.14 | 1.6E$^{-6}$/2.0E$^{-5}$ |
| S-ImTFSI (64-16) | 1.00:0.58:0.39 | 7.57E$^{-6}$/2.14E$^{-4}$ |
| S-ImTFSI (64-16) | 1.00:3.00:0.39 | 7.82E$^{-6}$/1.57E$^{-4}$ |
| S-ImTFSI (64-16) | 1.00:5.81:0.39 | 6.59E$^{-6}$/1.18E$^{-4}$ |
| S-ImTFSI (127-20) | 1.00:5.81:0.39 | 7.01E$^{-6}$/9.37E$^{-5}$ |
| S-ImTFSI (127-20) | 1.00:5.81:0.79 | Not measured |
| S-ImTFSI (127-20) | 1.00:5.81:2.36 | Not measured |
| S-ImTFSI (127-20) | 1.00:8.72:1.57 | Not measured |
| S-ImTFSI (127-31) | 1.00:5.81:0.39 | 5.24E$^{-6}$/1.14E$^{-4}$ |
| S-ImTFSI (127-73) | 1.00:5.81:0.39 | Not measured |

Example 4

Morphology of the Polymers and their Electrolyte Compositions

The morphology of the polymers and their electrolyte compositions were determined by Small-angle X-ray scattering (SAXS).

In the case of polymer samples, a lamellar phase is observed for S-ImTFSI (64-16), S-ImTFSI (127-20) and S-ImTFSI (127-31) at room temperature, although S-ImTFSI (127-20) appears to be more ordered (i.e. additional Bragg peaks observed). This can be appreciated in the data shown in the plots of FIG. 3A-D. It was also observed that S-ImTFSI (127-73) exhibits a weakly ordered hexagonal phase. Annealing at 120° C. for 24 h enhances ordering in all polymer samples, with exception of S-ImTFSI (127-31), which exhibits biphasic region of a lamellar phase (major phase) and hexagonal phase (minor phase). This is consistent with the observation of a hexagonal phase with further increase of the PIL phase (S-ImTFSI (127-73)). No phase change was observed for all polymer samples at temperatures in the range from room temperature to 85° C.

Figure 4:
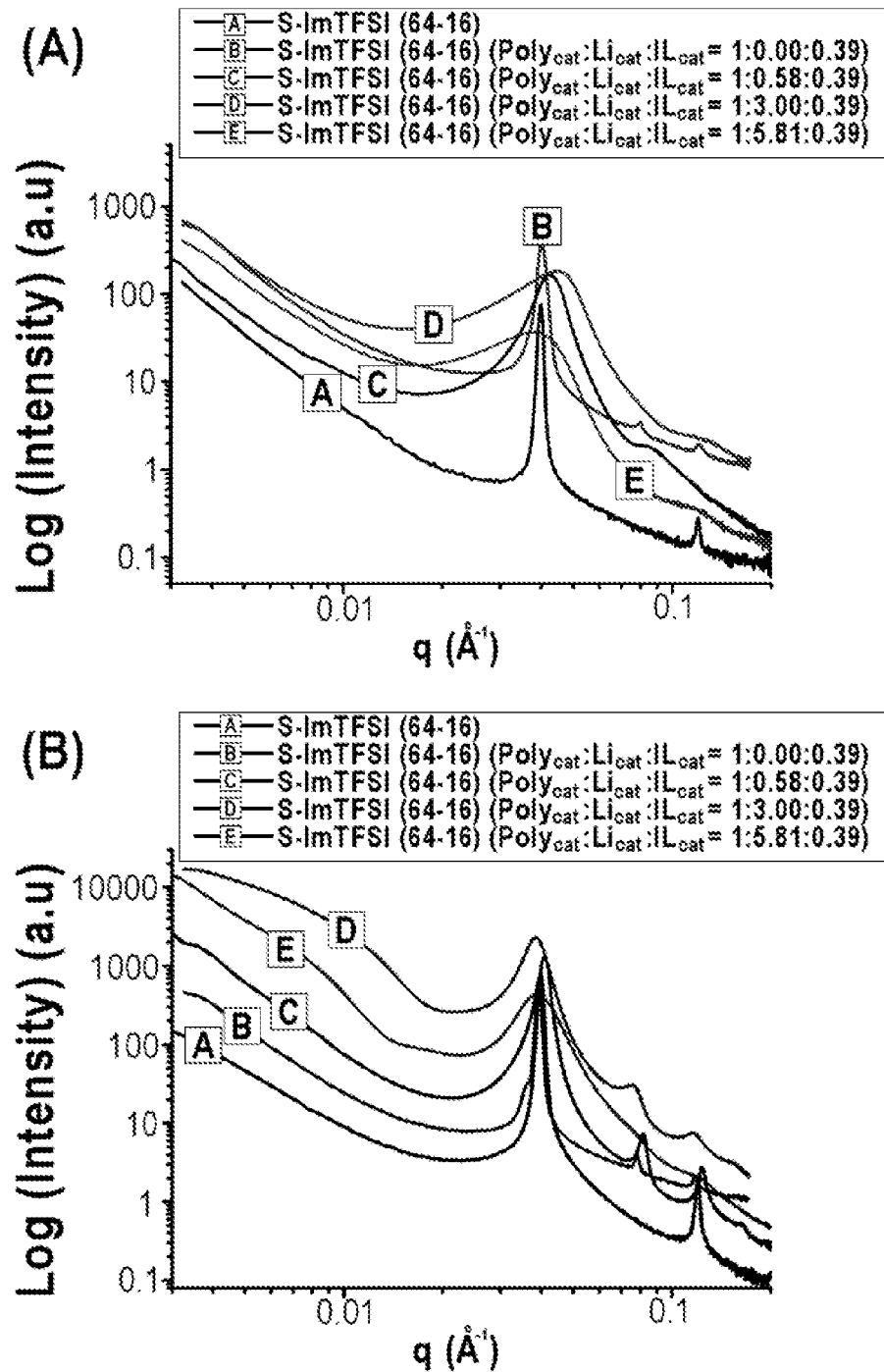
FIG. 4 shows SAXS profiles of the S-ImTFSI (64-16) with various $Li_{cat}/poly_{cat}$ molar ratio (i.e. 0.00, 0.58, 3.00 and 5.81) and a fixed $IL_{cat}/poly_{cat}$ molar ratio of 0.39 as well as S-ImTFSI (64-16), without (A) and (B) with annealing treatment at 120° C. for 24 hours.

FIG. 4(A) shows SAXS profiles of the S-ImTFSI (64-16) with various $Li_{cat}/poly_{cat}$ molar ratio (i.e. 0.00, 0.58, 3.00 and 5.81) and a fixed $IL_{cat}/poly_{cat}$ molar ratio of 0.39 as well as S-ImTFSI (64-16), without annealing treatment. All composition presented in FIG. 4(A) exhibits a lamellar phase, although ordering change are observed. The addition of C$_3$mpyrFSI to S-ImTFSI (64-16) results in the formation of a more ordered lamellar phase (i.e. additional Bragg peaks observed). As LiFSI is introduced into the system, third order diffraction associated with the lamellar phase almost disappear and the full width at half maximum (FWHM) of the first order diffraction increases significantly. This suggests that the lamellar become less ordered as LiFSI is introduced. As $Li_{cat}/poly_{cat}$ molar ratio increases up to 5.81, the lamellar phase becomes less and less ordered. From a $Li_{cat}/poly_{cat}$ molar ratio of 3.00, the lamellar phase observed can be considered as weakly ordered.

FIG. 4(B) shows SAXS profiles of the S-ImTFSI (64-16) with various $Li_{cat}/poly_{cat}$ molar ratio (i.e. 0.00, 0.58, 3.00 and 5.81) and a fixed $IL_{cat}/poly_{cat}$ molar ratio of 0.39 as well as S-ImTFSI (64-16), with annealing treatment (120° C. for 24 hours). Similar trend than that of the no annealed samples are observed. Although, the use of an additional annealing treatment results in the formation or more ordered lamellar phase, with the exception of S-ImTFSI (64-16) having a $poly_{cat}:Li_{cat}:IL_{cat}$ molar ratio of 1:00:0.58:0.39. Additionally, for S-ImTFSI (64-16) composite with a $poly_{cat}:Li_{cat}:IL_{cat}$ molar ratio of 1:00:0.00:0.39, additional first order diffraction is also observed after annealing, suggesting the present of biphasic region. The nature of the second phase could not be determined, due to the absence of additional associated diffraction.

Figure 5:
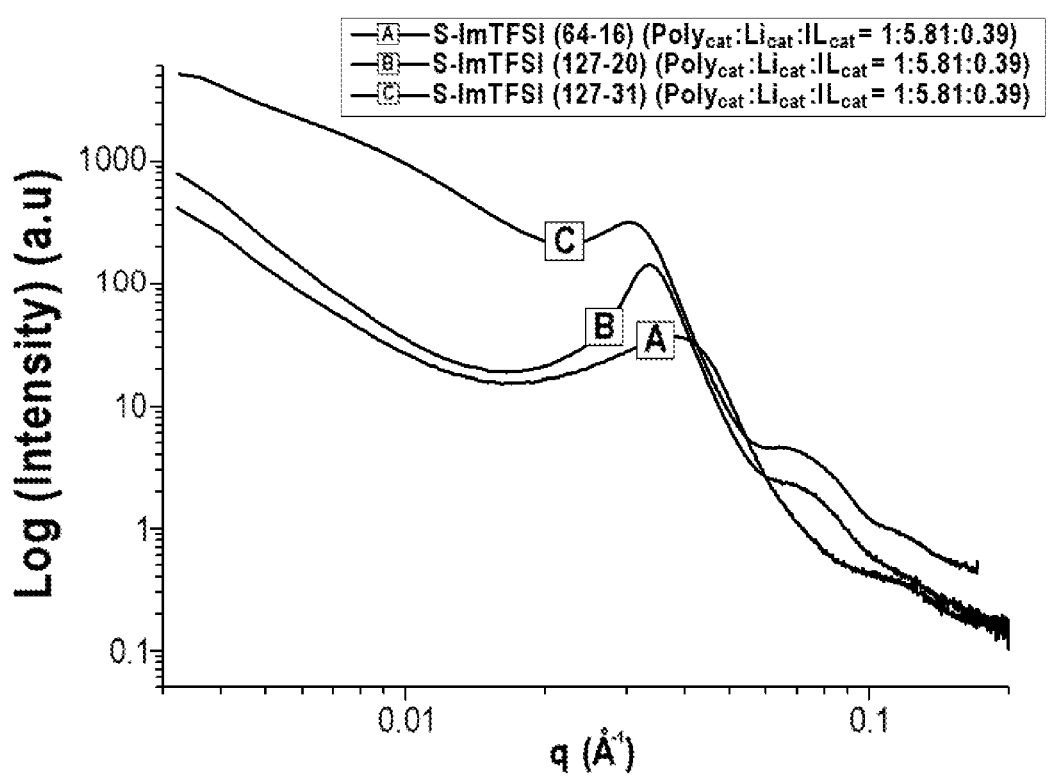
FIG. 5 shows SAXS profiles of the S-ImTFSI compositions having a $poly_{cat}$:$Li_{cat}$:$IL_{cat}$ molar ratio of 1:00:5.81:0.39, with different styrene and PIL degree of polymerization.

FIG. 5 shows SAXS profiles of the S-ImTFSI composites having a $poly_{cat}:Li_{cat}:IL_{cat}$ molar ratio of 1:00:5.81:0.39, with different styrene and PIL degree of polymerization. Although all compositions exhibit a weakly ordered lamellar phase, the FWHM of the first order diffraction first decreases when increase the styrene DP (S-ImTFSI (127-20) composite vs. S-ImTFSI (64-16) composite). This likely indicates that the lamellar phase is becoming slightly more ordered. However, the opposite trend is observed when increasing the PIL DP while keeping the DP of the styrene block constant (i.e. S-ImTFSI (127-20) composite vs. S-ImTFSI (127-31) composite).

Example 5

Mechanical Properties of the Polymers and their Electrolyte Compositions

In the case of polymer samples, films made with S-ImTFSI (64-16) are quite brittle. Films made with S-ImTFSI (127-20) are more robust than the films made with S-ImTFSI (64-16), likely due to the increase of the styrene DP at a given PIL DP. In particular, films made with S-ImTFSI (127-73) are soft and spongy, likely due to the increase of the PIL DP.

In the case of S-ImTFSI containing LiFSI and/or C$_3$mpyrFSI, the addition of LiFSI and/or C$_3$mpyrFSI to S-ImTFSI polymer, independently of their DP, results in more flexible and softer materials.

For S-ImTFSI composites having a $poly_{cat}:Li_{cat}:IL_{cat}$ molar ratio of 1:00:5.81:0.39 (high lithium salt content), films made with S-ImTFSI (127-20) appear to be more robust than corresponding one, made with S-ImTFSI (64-16), again likely due to the increase of the styrene DP at a given PIL DP.

Example 6

Electrochemical Stability and Li Transport Properties of the Compositions

Lithium transport properties and electrochemical stability of the compositions against lithium metal electrodes were investigated using lithium symmetrical cells that were galvanostatically cycled at various current densities at 50° C.

Figure 6:
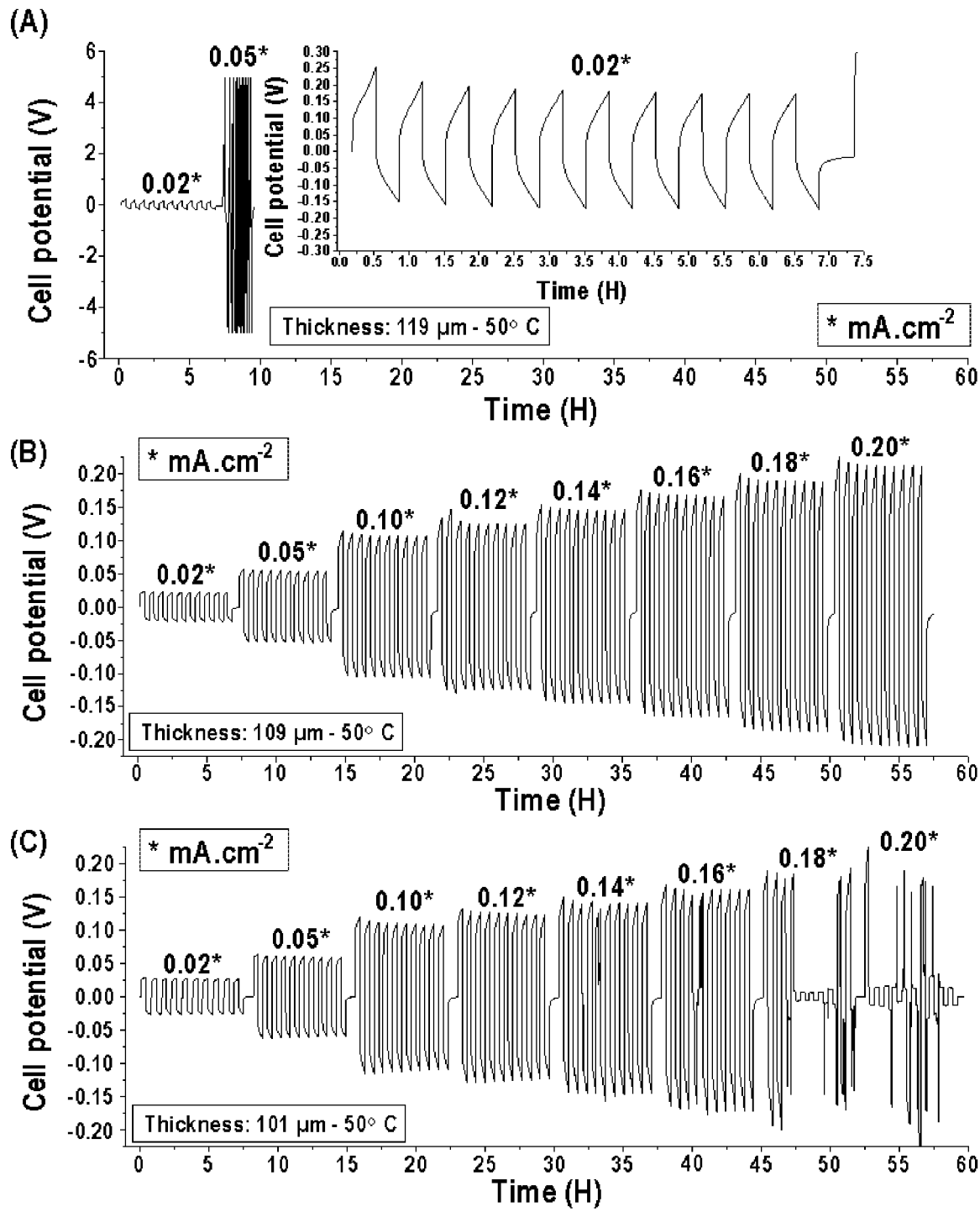
FIG. 6 shows galvanostatic cycling at 50° C. of S-ImTFSI (64-16) compositions having various $Li_{cat}/poly_{cat}$ molar ratio (specifically (a) 0.58, (b) 3.00 and (c) 5.81) at a fixed $IL_{cat}/poly_{cat}$ molar ratio of 0.39, from a current density of 0.02 mA·cm$^{-2}$ to 0.2 mA·cm$^{-2}$

FIG. 6 shows galvanostatic cycling of S-ImTFSI (64-16) compositions having various $Li_{cat}/poly_{cat}$ molar ratio, and specifically (a) 0.58, (b) 3.00 and (c) 5.81 at a fixed $IL_{cat}/poly_{cat}$ molar ratio of 0.39. Although all these compositions exhibit similar conductivity (e.g. ~$7E^{-6}$ S·cm$^{-1}$ at 50° C.), significant voltage response difference are observed while cycled Galvano statically from 0.02 mA·cm$^{-2}$ to 0.2 mA·cm$^{-2}$. In the case of the S-ImTFSI (64-16) having a $poly_{cat}:Li_{cat}:IL_{cat}$ molar ratio of 1:00:0.58:0.39, stable overpotential of 0.17 V are obtained for a current density of 0.02 mA·cm$^{-2}$. However, increasing current density to 0.05 mA·cm$^{-2}$ results in the over-potential reaching a value of 5.0 V after 9.6 mins of polarization. Increasing $Li_{cat}/poly_{cat}$ molar ratio to 3.00 results in the observation of stable overpotential of 0.11 V and 0.21 V for a current density of 0.1 mA·cm$^{-2}$ and 0.2 mA·cm$^{-2}$, respectively. Further increase of $Li_{cat}/poly_{cat}$ molar ratio to 5.81 results in the observation of stable overpotential of 0.11 V for a current density of 0.1 mA·cm$^{-2}$. However, signs of cell failure are observed at current density of 0.18 mA.cm$^{-2}$, due to short circuit.

These results show that having a $Li_{cat}/poly_{cat}$ molar ratio of at least 3.00, enhances the transport properties of these materials. The fact that the three compositions mentioned above have similar ionic conductivity, suggests that the ion dynamic in these systems has changed when a $Li_{cat}/poly_{cat}$ molar ratio of at least 3.00 is used. However, when a $Li_{cat}/poly_{cat}$ molar ratio of 5.81 is used, signs of cell failure are observed at a current density of 0.18 mA·cm$^{-2}$ (due to short circuit), despite the enhanced lithium transport. This could likely be due to the mechanical strength difference between the S-ImTFSI (64-16) compositions with a $Li_{cat}/poly_{cat}$ molar ratio of 5.81 and 3.00. As the former is softer than the latter.

Figure 7:
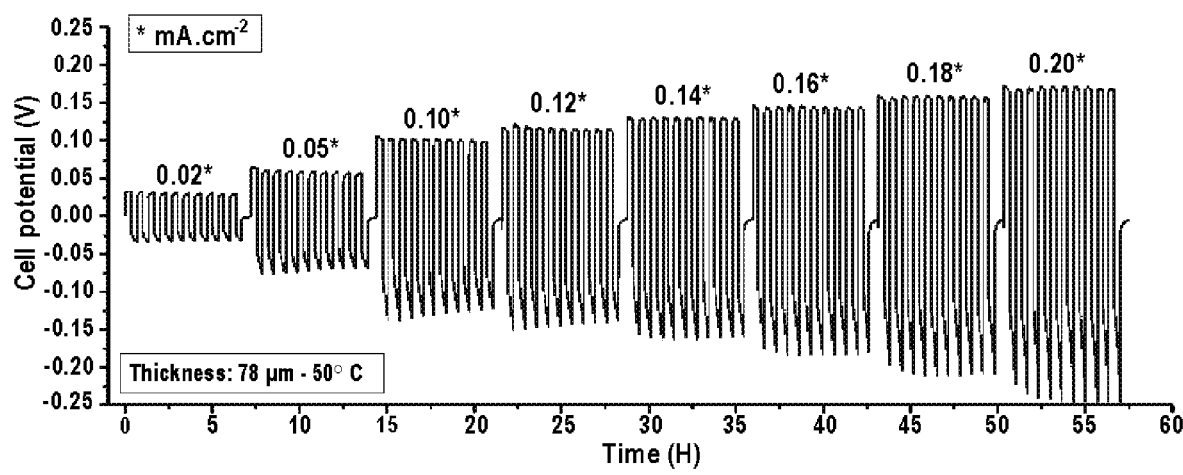
FIG. 7 shows galvanostatic cycling at 50° C. of S-ImTFSI (127-31) with a $poly_{cat}$:$Li_{cat}$:$IL_{cat}$ molar ratio of 1:00:5.81:0.39, from a current density of 0.02 mA·cm$^{-2}$ to 0.2 mA.cm$^{-2}$.

FIG. 7 shows galvanostatic cycling of S-ImTFSI (127-31) with a $poly_{cat}:Li_{cat}:IL_{cat}$ molar ratio of 1:00:5.81:0.39, from a current density of 0.02 mA·cm$^{-2}$ to 0.2 mA·cm$^{-2}$. Stable overpotential of 0.12 V and 0.25 V for a current density of 0.1 mA·cm$^{-2}$ and 0.2 mA.cm$^{-2}$, respectively.

These results suggest that increasing both styrene and the molecular weight of the ionic and non ionic block polymer (while keeping styrene to polymer ratio constant) does not affect the lithium transport property. Additionally, higher current density (i.e. 0.18 mA·cm$^{-2}$ vs. 0.20 mA·cm$^{-2}$) could be applied for S-ImTFSI (127-31) compositions compared to that of S-ImTFSI (64-16) with a $poly_{cat}:Li_{cat}:IL_{cat}$ molar ratio of 1:00:5.81:0.39. Again, this is likely due to mechanical properties difference, since their ionic conductivities are similar.

Example 7

Figure 8:
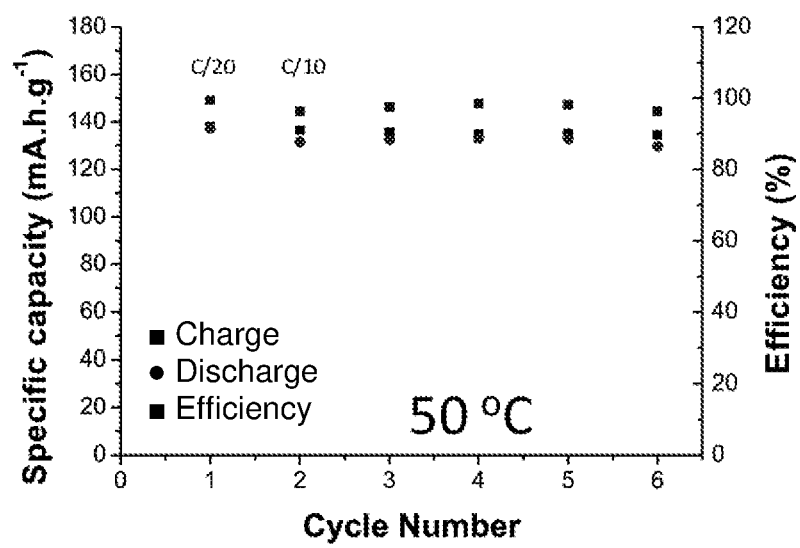
FIG. 8 shows charge/discharge capacities and coulombic efficiencies (CEs) as a function of cycle number of cells using S-ImTFSI (64-16) (Li/ImTFSI=5.81; $C_3$mpyrFSI/ImTFSI=0.39) composition as electrolyte at either 50° C. (A) and 90° C. (B)
Figure 8:
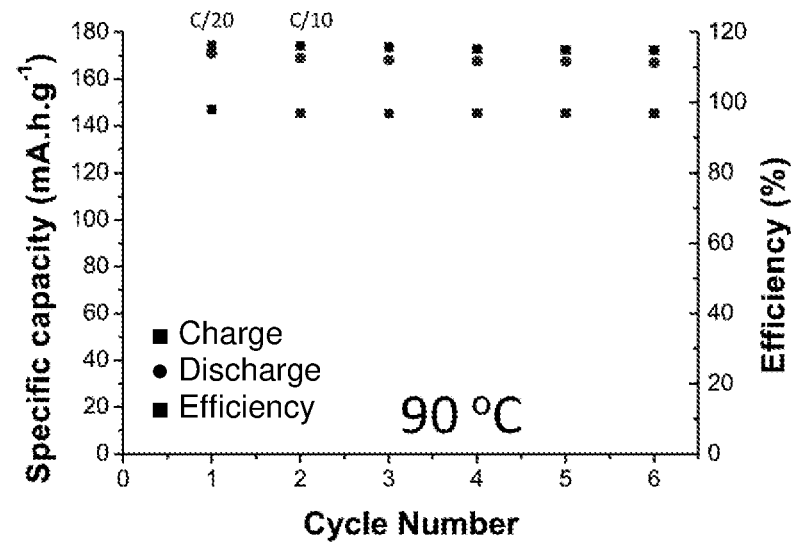

Cycling Performance of Li Metal Electrolyte Composite| Lithium Iron Phosphate Cell Electrochemical tests were also performed in Li metal electrolyte composition| Lithium iron phosphate configuration. The results are plotted in FIG. 8, and refer to tests performed on a full cell using S-ImTFSI (64-16) (Li/ImTFSI=5.81; C$_3$mpyrFSI/ImTFSI=0.39) composition as electrolyte.

In the tested cells, S-ImTFSI (64-16) was also used as a bifunctional binder for cathode electrode. The full cells were first cycled at a C-rate of C/20 for 1 cycle and then at a C-rate of C/10 for 5 cycles at either 50° C. or 90° C.

Cathode electrodes were prepared as followed:

A slurry of lithium iron phosphate (LFP) based polymer cathode material was prepared by mixing LFP active material (60 wt. %), carbon C65 (10 wt. %) and S-ImTFSI (64-16) as binder (30 wt. %) with a minimum amount of N-Methyl-2-pyrrolidone (NMP). LFP based slurry was casted on A1 current collector. LFP based cathode electrode was pre-dry in air for 24 hours and then further was further dried under high vacuum at 50° C. for 24 hours. The resulted cathode electrode has a LFP loading of 2.1 mg·cm$^{-2}$ (0.35 mAh.cm$^{-2}$).

FIG. 8a shows the charge/discharge capacities and coulombic efficiencies (CEs) as a function of cycle number of cells using S-ImTFSI (64-16) (Li/ImTFSI=5.81; C$_3$mpyrFSI/ImTFSI=0.39) composition as electrolyte at 50° C. For the initial cycle at a C-rate of C/20, a CE of 99.4% is observed with a charge and discharge capacity of 138 mAh.g$^{-1}$ and 137 mAh.g$^{-1}$, respectively. For the subsequent cycle at a C-rates of C/10, a charge and discharge capacity of 137 mAh.g$^{-1}$ and 131 mAh.g$^{-1}$ is obtained, respectively. In this case, CE slightly decreases to 96.3%. Upon the following 4 cycles, the charge/discharge capacity and CE remains relatively constant, with a capacity retention of 98.6%.

The same cell was used for further cycling testing at 90° C. and results are shown in FIG. 8b. For the initial cycle at a C-rate of C/20, a CE of 116.2% is observed with a charge and discharge capacity of 147 mAh.g$^{-1}$ and 170 mAh.g$^{-1}$, respectively. The high value of Ce (Ce>100%) could be explained as the cell were cycled before at 50° C., which didn't allow a full discharge to occur. However, near theoretical capacity was obtained for the first discharge at a C-rate of C/20. For the subsequent cycle at a C-rates of C/10, a charge and discharge capacity of 174 mAh.g$^{-1}$ and 168 mAh.g$^{-1}$ is obtained, respectively. In this case, CE slightly decreases to 97.0%. Upon the following 4 cycles, the charge/discharge capacity and CE remains relatively constant, with a capacity retention of 98.8%.

Example 8

Synthesis of lithium poly(methylmethacrylate-b-4-styrene-sulfonyl(trifluoromethylsulfonyl) imide) (MA-sTFSILi) and lithium poly(methylmethacrylate-b-1-[3-(methacryloyloxy)-propylsulfonyl]-1-(trifluoromethylsulfonyl)imide) (MA-mTFSILi)

MA-sTFSILi and MA-mTFSILi polymers were made by chain extending polymethylmethacrylate-macroRAFT, with the respective styTFSI.Et3NH and mTFSI.Et3NH monomers using free radical polymerisation, followed by cation exchange of triethylammonium to lithium. Procedures were adapted from (i) J. Li, H. Zhu, X. Wang, M. Armand, D. R. MacFarlane and M. Forsyth, *Electrochim. Acta*, 2015, 175, 232-239, (ii) L. Porcarelli, A. S. Shaplov, M. Salsamendi, J. R. Nair, Y. S. Vygodskii, D. Mecerreyes and C. Gerbaldi, *ACS Appl. Mater. Interfaces*, 2016, 8, 10350-10359, (iii) M. Mumtaz, K. Aissou, D. Katsigiannopoulos, C. Brochon, E. Cloutet and G. Hadziioannou, *RSC Advances*, 2015, 5, 98559-98565, the contents of which are incorporated herein in their entirety.

Briefly, styTFSI.Et$_3$NH monomer was isolated after activation of sodium 4-styrene sulfonate with thionyl chloride, followed by reaction with trifluoromethanesulfonamide under basic conditions. mTFSI.Et$_3$NH monomer was similarly obtained, using potassium 3-(methacryloyloxy) propane-1-sulfonate.

Figure 9:
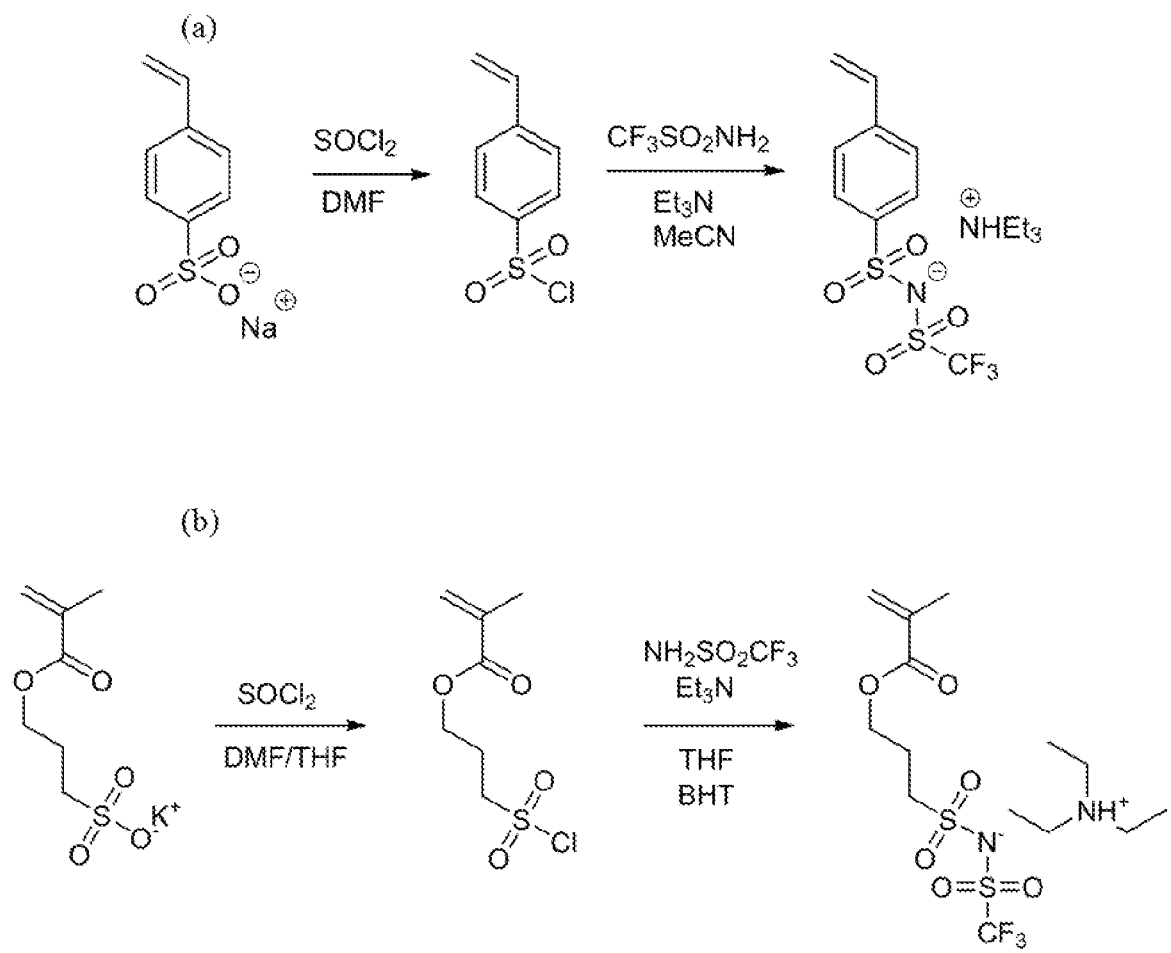
FIG. 9 shows (a) the synthesis scheme of styTFSI.Et$_3$NH monomer, and (b) the synthesis scheme of mTFSI.Et$_3$NH monomer, in the presence of BHT inhibitor.

Polymethylmethacrylate-macro RAFT was synthesised from methylmethacrylate and 4-cyano-4-pentanoic acid dodecyl trithiocarbonate in dioxane at 70° C. using Vazo 68 as an initiator. Based on 1H NMR analysis, monomer conversion of 59% (DP=116) was obtained at 4.5 h of reaction time. The resulting polymer was purified by precipitating in cyclohexane 3 times (Đ=1.17 by GPC in DMAc). Chain extension with styTFSI.Et3NH,$^3$ to 100% monomer conversion (DP=29), was achieved in N,N-dimethylformamide (DMF) at 70° C. using Vazo 68 initiator after 26 h of reaction. Chain extension with mTFSI.Et3NH,$^2$ to 80% monomer conversion (DP=29) at 3.5 h, was performed in DMF at 70° C. using Vazo 68 initiator. Monomer syntheses are shown in FIGS. 9(a) and 9(b).

Cation exchange using 7-11 equivalents of lithium hydroxide monohydrate in methanol or DMF/water at 60° C. for 24-25 h, followed by dialysis against water, afforded MA-sTFSILi (116-29) or MA-mTFSILi (116-29) as pale yellow solids.

Figure 10:
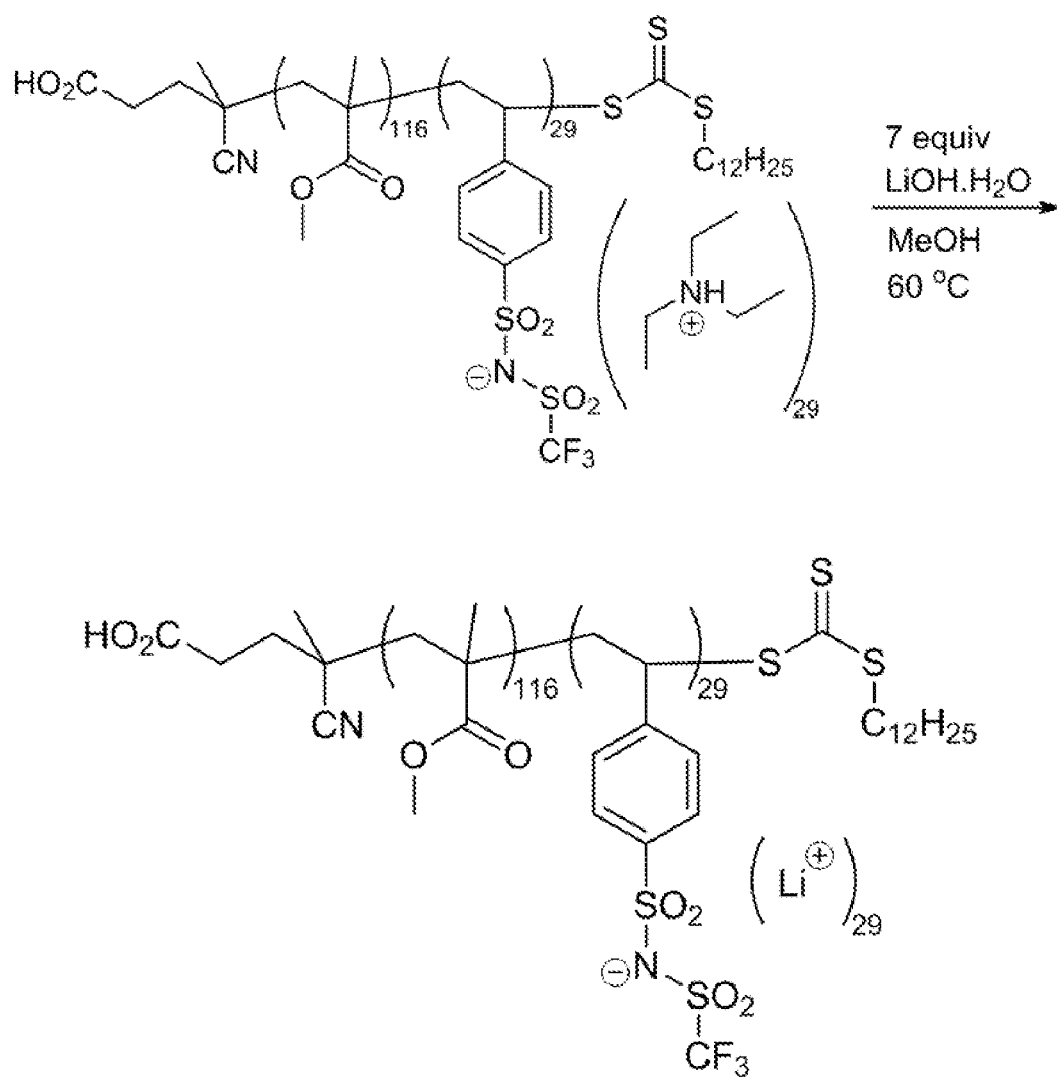
FIG. 10 shows the synthesis scheme of lithium poly (methylmethacrylate-b-4-styrenesulfonyl(trifluoromethylsulfonyl)imide) (MA-sTFSILi) (116-29) copolymer.
Figure 11:
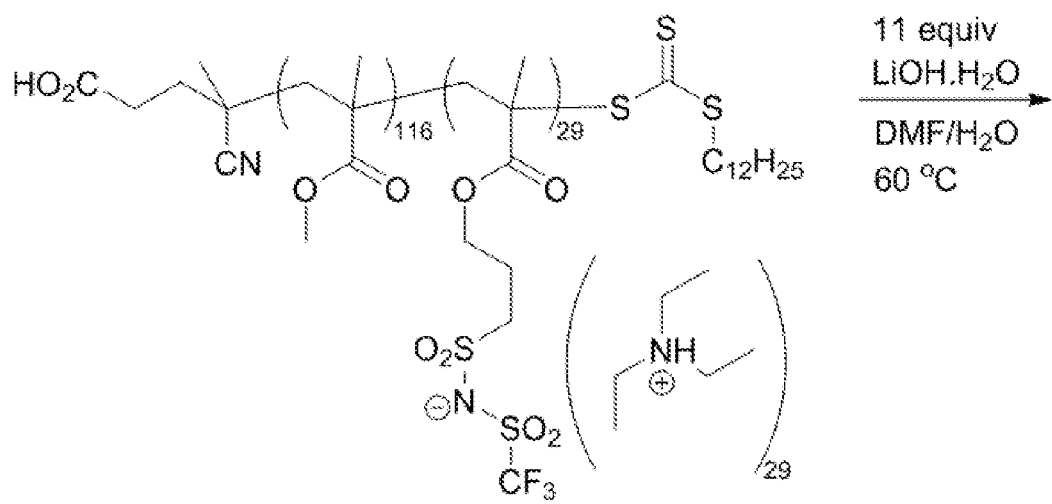
FIG. 11 shows the synthesis schematic of poly(methylmethacrylate-b-1-[3-(methacryloyloxy)-propylsulfonyl]-1-(trifluoromethylsulfonyl)imide) (MA-mTFSILi) (116-29) copolymer.
Figure 11:
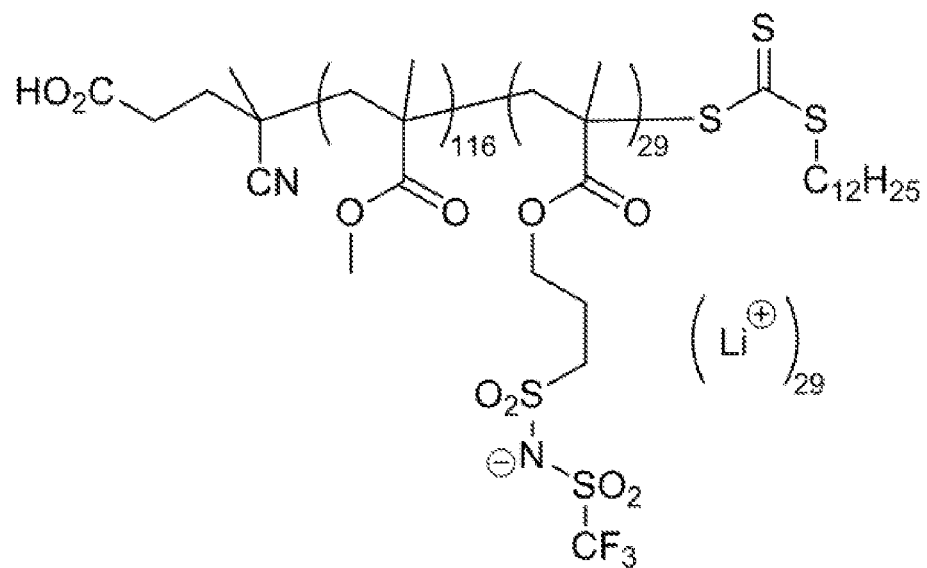

The cation exchange reactions of triethylammonium to lithium, using an excess of lithium hydroxide monohydrate, are shown in FIGS. 10 and 11.

Example 9

Characterisation of MA-sTFSILi and MA-mTFSILi synthesised according to the procedure described in Example 8 was performed using NMR. Solution state nuclear magnetic resonance (NMR) spectra were obtained with a Bruker BioSpin Av400 spectrometer (400 MHz for 1H, 376 MHz for 19F, 155 MHz for 7Li). 1H and 13C chemical shifts were referenced to residual solvent signals. 19F and 7Li chemical shifts were externally referenced to CFCl3 and LiCl (1M in D2O), respectively.

The samples were also characterised by GPC on a Shimadzu system equipped with a CMB-20A controller, a SIL-20A HT autosampler, a LC-20AT tandem pump system, a DGU-20A5 degasser unit, a CTO-20AC column oven, a RID-10A refractive index (RI) detector, and four Styragel HT columns.

N,N-Dimethylacetamide (containing 4.3 gL-1 LiBr) was used as the eluent at a flow rate of 1 mLmin$^{-1}$. The column temperature was set to 80° C. and the temperature at the RI detector was set to 35° C. The GPC columns were calibrated with low dispersity polymethylmethacrylate standards and molar masses are reported as polymethylmethacrylate equivalents. Number (Mn) and mass-average (Mw) molar masses were evaluated using the Shimadzu LC Solution software.

MA-sTFSILi (116-29). $^1$H NMR (DMSO-d$_6$) δ7.80-6.05 (broad m, aromatic peaks), 3.84-3.39 (broad s, CH$_3$CO$_2$), 2.39-0.42 (broad m, polymer backbone). $^{19}$F ($^1$H decoupled) NMR (DMSO-d$_6$), δ-78.95 (broad). $^7$Li NMR (DMSO-d$_6$), δ-1.175. GPC: $M_n$=17 400, Đ=1.16.

MA-mTFSILi (116-29). $^1$H NMR (DMSO-d$_6$) δ 4.37-3.43 (broad m, CH$_3$CO$_2$, CO$_2$CH$_2$CH$_2$CH$_2$SO$_2$), 3.05-2.83 (broad s, CO$_2$CH$_2$CH$_2$CH$_2$SO$_2$), 2.30-0.26 (broad m, polymer backbone). $^{19}$F ($^1$H decoupled) NMR (DMSO-d$_6$), δ-78.74 (broad). $^7$Li NMR (DMSO-d$_6$), δ-1.164. GPC: $M_n$=16 700, Đ=1.19.

Example 10

Figure 12:
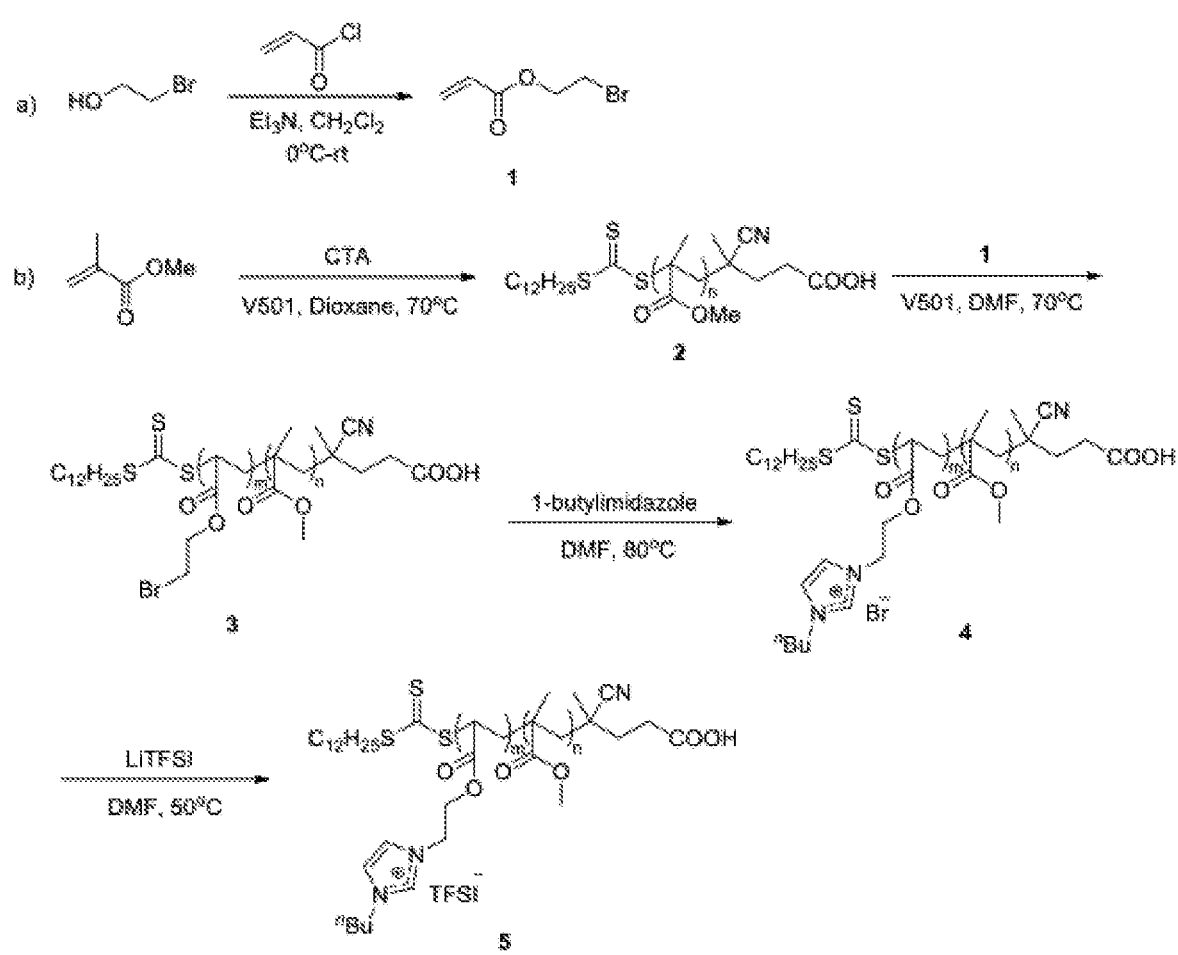
FIG. 12 shows the synthesis schematic of a copolymer having a PMMA-based non-ionic block and an butyl-imidazolium-based ionic block.

A copolymer having a PMMA-based non-ionic block and an butyl-imidazolium-based ionic block was synthesised according to a procedure depicted in FIG. 12. Specifically, the synthesis was tailored to produce a PMMA-ImTFSI block co-polymer having a (116-32) degree of polymerisation of the two blocks, respectively, to obtain a (poly$_{cat}$:Li$_{cat}$:IL$_{cat}$) molar ratio of 1:00:5.81:0.39.

Figure 13:
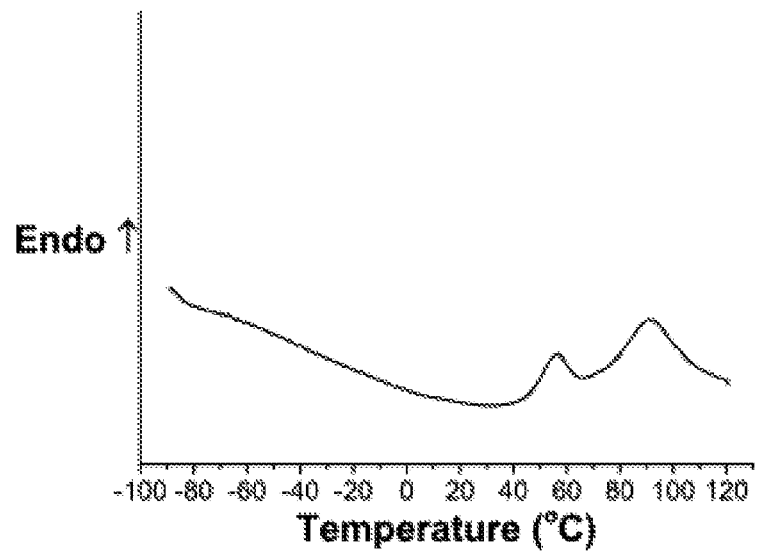
FIG. 13 shows DSC data for (a) a PMMA-ImTFSI (116-32) block co-polymer having a ($poly_{cat}$:$Li_{cat}$:$IL_{cat}$) molar ratio of 1:00:5.81:0.39, and (b) an electrolyte composition obtained combining the PMMA-ImTFSI (116-32) block co-polymer with a lithium salt and an organic ionic liquid.
Figure 13:
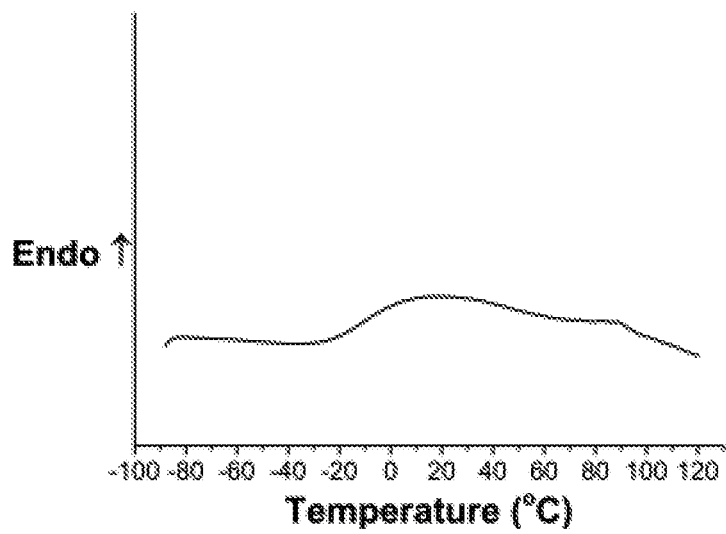

DSC characterisation of the copolymer alone and of the copolymer in an electrolyte composition containing (i) the copolymer, (ii) lithium salt and (iii) organic ionic liquid is shown in FIGS. 13(a) and 13(b). The data allow appreciating that both the copolymer alone and the electrolyte composition have two distinct Tg values.

Example 11

Figure 14:
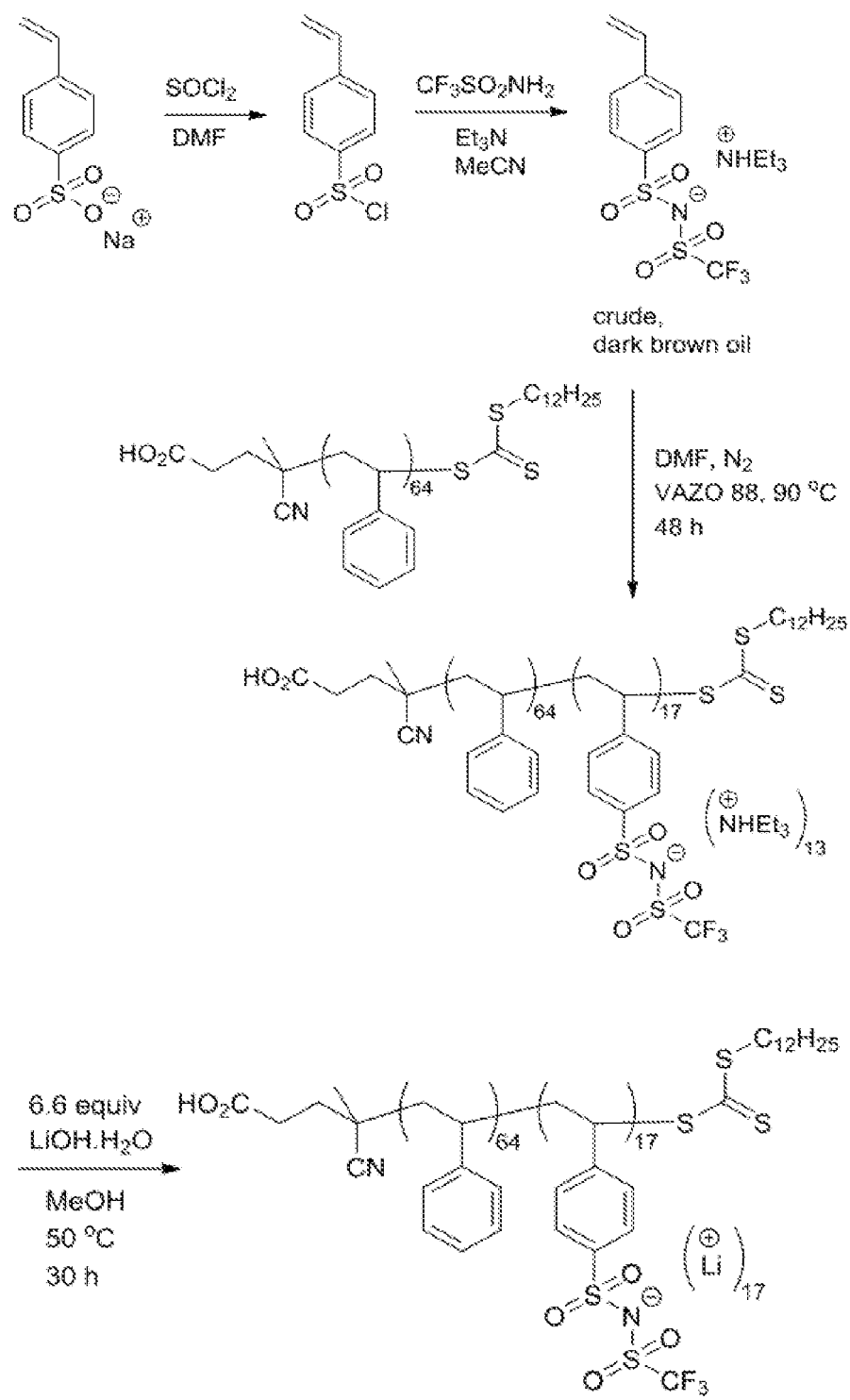
FIG. 14 shows the synthesis schematic of a poly-styrene (S)-based copolymer having an ionic block comprising a styrene-TFSI (sTFSI) anionic pendant moiety.

The synthesis of a poly-Styrene (S)-based copolymer having an ionic block comprising a styrene-TFSI (sTFSI) anionic pendant moiety is shown in the schematic of FIG. 14. The synthesis procedure was adopted to produce a S-sTFSI with degree of polymerisation of (64-17), respectively. Lithium was used as the counter cation to the pendant sTFSI anion, to obtain a sample named S-sTFSI/Li(64-17).

The S-sTFSI/Li(64-17) sample described in this Example, and a S-Im/TFSI(64-16) sample described in Example 1 were used to produce four electrolyte compositions in combination with lithium salt and an organic ionic liquid (i.e. free ionic liquid), as follows:

Electrolyte composition A=(S-Im/TFSI(64-16))+(Li-TFSI)+(free ionic liquid),

Electrolyte composition B=(S-Im/TFSI(64-16)/S-sTFSI/Li(64-17)=1:1)+(Li-TFSI)+(free ionic liquid), Electrolyte composition C=(S-Im/TFSI(64-16)/S-sTFSI/Li(64-17)=1:2)+(Li-TFSI)+(free ionic liquid), and Electrolyte composition D=(S-sTFSI/Li(64-17))+(Li-TFSI)+(free ionic liquid).

Figure 15:
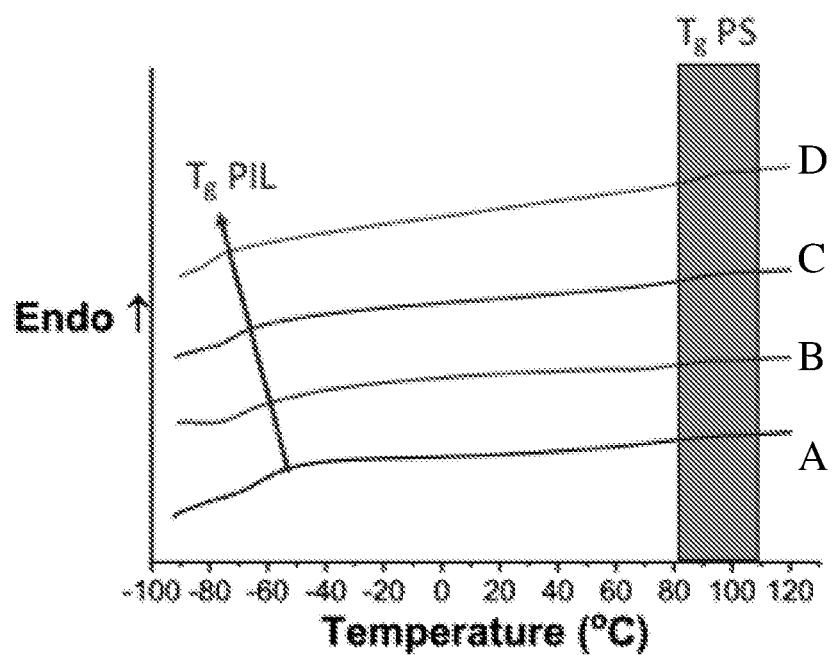
FIG. 15 shows DSC data obtained on four electrolyte compositions, respectively obtained combining a lithium salt, an organic ionic liquid, and (A) a S-Im/TFSI(64-16) copolymer, (B)S-Im/TFSI(64-16) and S-sTFSI/Li(64-17) copolymers used at a 1/1 molar ratio, (C)S-Im/TFSI(64-16)
Figure 16:
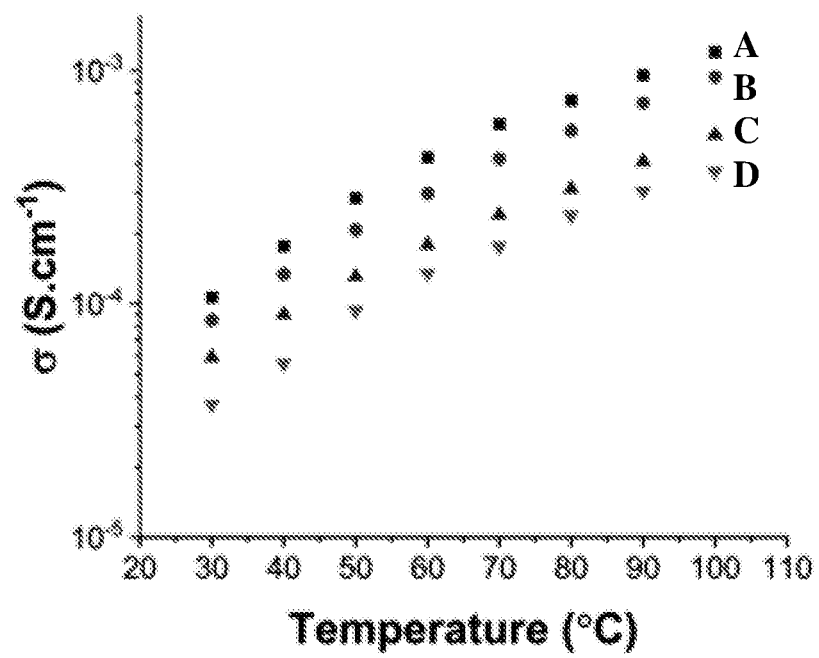
FIG. 16 shows ionic conductivity values measured on four electrolyte compositions, respectively obtained combining a lithium salt, an organic ionic liquid, and (A) a S-Im/TFSI(64-16) copolymer, (B)S-Im/TFSI(64-16) and S-sTFSI/Li(64-17) copolymers used at a 1/1 molar ratio, (C)S-Im/TFSI(64-16) and S-sTFSI/Li(64-17) copolymers used at a 1/2 molar ratio, or (D) a S-sTFSI/Li(64-17) copolymer.

Relative (Li:copolymer) and (free ionic liquid:polymer) molar ratios were 2 and 1.5, respectively. All compositions showed two values of Tg measured with DSC, as shown in FIG. 15. Ionic conductivity data is shown in FIG. 16.

Example 12

Samples of S-Im/TFSI(64-16) and S-sTFSI/Li(64-17) as synthesised according to the procedures described in Examples 1 and 11 were used to form four electrolyte compositions in combination with a lithium salt (Li-TFSI) and ethylene carbonate (EC) organic electrolyte.

Electrolyte composition A=(S-Im/TFSI(64-16) or S-sTFSI/Li(64-17))+(Li-TFSI)+(EC), according to (Li:copolymer)=2, and (EC:copolymer)=1.5 molar ratios, Electrolyte composition B=(S-Im/TFSI(64-16) or S-sTFSI/Li(64-17))+(Li-TFSI)+(EC), according to (Li:copolymer)=2, and (EC:copolymer)=6 molar ratios, Electrolyte composition C=(S-Im/TFSI(64-16) or S-sTFSI/Li(64-17))+(Li-TFSI)+(EC), according to (Li:copolymer)=2, and (EC:copolymer)=12 molar ratios, Electrolyte composition D=(S-Im/TFSI(64-16) or S-sTFSI/Li(64-17))+(Li-TFSI)+(EC), according to (Li:copolymer)=4, and (EC:copolymer)=6 molar ratios, and Electrolyte composition E=(S-Im/TFSI(64-16) or S-sTFSI/Li(64-17))+(Li-TFSI)+(EC), according to (Li:copolymer)=6, and (EC:copolymer)=6 molar ratios.

Figure 17:
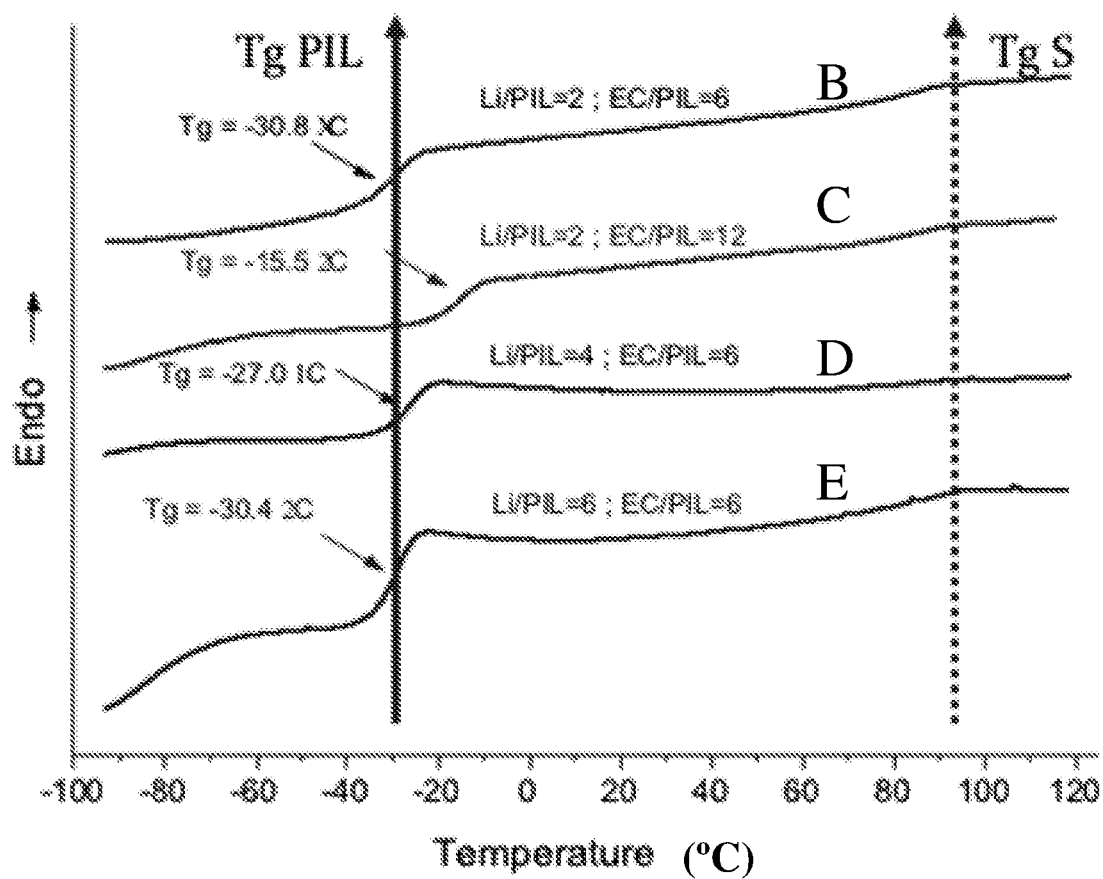
FIG. 17 shows DSC data obtained on four electrolyte compositions, respectively obtained combining a lithium salt (Li-TFSI), an organic electrolyte (ethylene carbonate), and (B)S-Im/TFSI(64-16) according to (Li:copolymer)=2, and (EC:copolymer)=6 molar ratios, (C)S-Im/TFSI(64-16) according to (Li:copolymer)=2, and (EC:copolymer)=12 molar ratios, (D)S-Im/TFSI(64-16) according to (Li:copolymer)=4, and (EC:copolymer)=6 molar ratios, or (E)S-Im/TFSI(64-16) according to (Li:copolymer)=6, and (EC:copolymer)=6 molar ratios.
Figure 18:
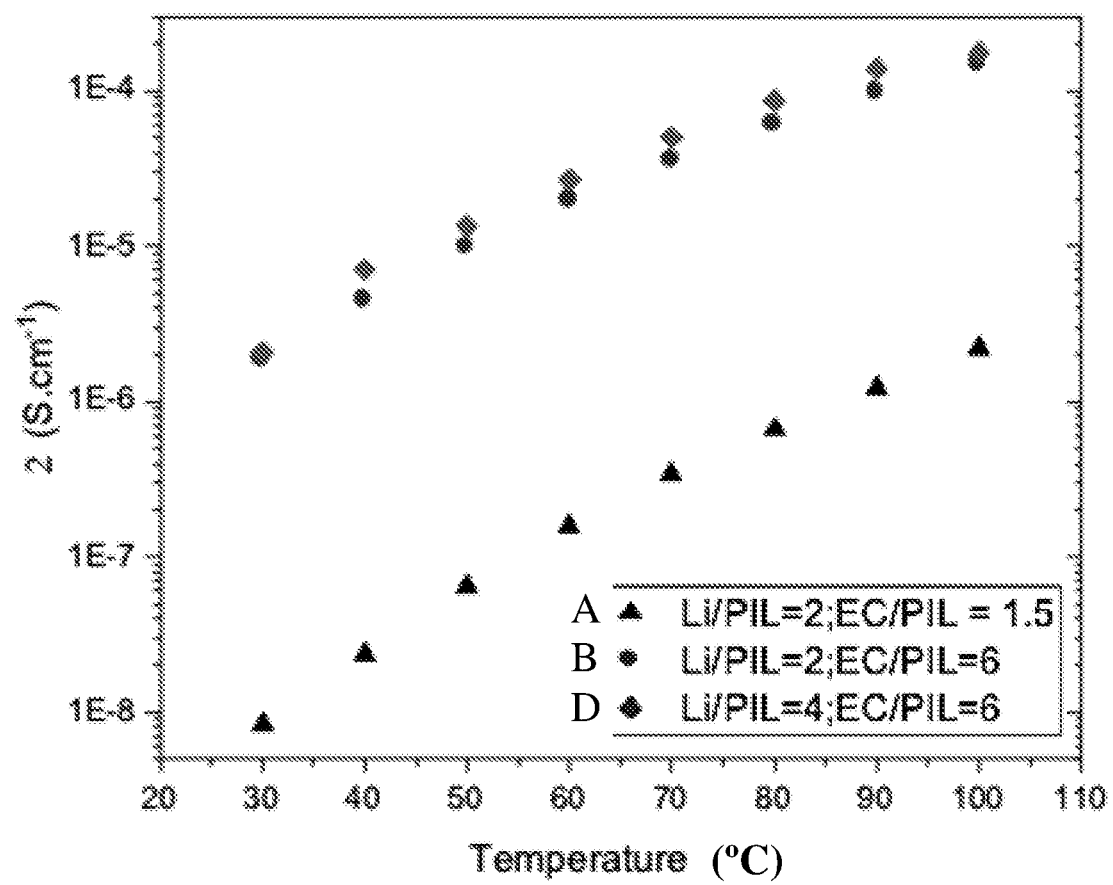
FIG. 18 shows ionic conductivity values measured on three electrolyte compositions, respectively obtained combining a lithium salt (Li-TFSI), an organic electrolyte (ethylene carbonate), and (A)S-Im/TFSI(64-16) according to (Li:copolymer)=2, and (EC:copolymer)=1.5 molar ratios, (B)S-Im/TFSI(64-16) according to (Li:copolymer)=2, and (EC:copolymer)=6 molar ratios, or (D)S-Im/TFSI(64-16) according to (Li:copolymer)=4, and (EC:copolymer)=6 molar ratios.

All compositions showed two values of Tg measured with DSC. FIG. 17 shows DSC plots measured for samples of the B, C, D and E kind obtained using S-Im/TFSI(64-16) as the copolymer. FIG. 18 shows corresponding ionic conductivity measurement data obtained using samples of the A, B and D obtained using S-Im/TFSI(64-16) as the copolymer.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The claims defining the invention are as follows:

1. An electrolyte composition comprising:
   i) a block copolymer,
   ii) an organic electrolyte, and
   iii) a lithium salt,
   wherein the block copolymer comprises a non-ionic block and an ionic block, the non-ionic block comprising polymerized residues of hydrophobic monomers, and the ionic block comprising polymerized monomer residues having covalently coupled thereto (a) a pendant organic ionic liquid cation, the pendant organic ionic liquid cation having a counter anion, (b) a pendant anionic moiety, the pendant anionic moiety having a counter cation, or (c) a combination thereof, and
   the electrolyte composition has at least two glass transition temperature (Tg) values.

2. The electrolyte composition of claim 1, wherein the molar weight of the non-ionic block combined with the ionic block is less than 40,000 g/mol.

3. The electrolyte composition of claim 1, wherein the lithium salt is present in an amount of at least 11 wt. % relative to the total weight of the electrolyte composition.

4. The electrolyte composition of claim 1, wherein the organic electrolyte is present in an amount of less than 55.0 wt. % relative to the total weight of the electrolyte composition.

5. The electrolyte composition of claim 1, wherein the non-ionic block comprises a repeating unit having either of the following structures (I) and (II):

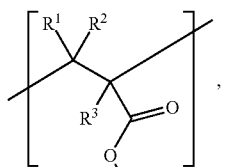

(I)

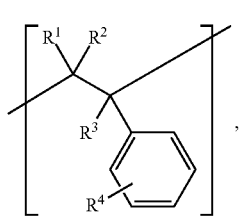

(II)

where $R^1$, $R^2$, $R^3$, and $R^4$ are each independently H or $C_{1-6}$ alkyl.

6. The electrolyte composition of claim 1, wherein the non-ionic block comprises polymerized residues of hydrophobic monomers derived from styrene or styrene derivatives, indene or indene derivatives, vinylpyridine or vinylpyridine derivatives, methyl methacrylate or methacrylate derivatives, or a combination thereof.

7. The electrolyte composition of claim 6, wherein the non-ionic block comprises polymerized residues of hydrophobic monomers derived from α-methylstyrene, methylstyrene, chlorostyrene, hydroxystyrene, vinylbenzyl chloride, methylindene, ethylindene, trimethylindene, vinylmethylpyridine, vinylbutylpyridine, vinylquinioline, vinylacrydine, hydroxyethyl methacrylate, dimethylaminoethyl methacrylate, vinylcarbaxole, or a combination thereof.

8. The electrolyte composition of claim 1, wherein the ionic block comprises a repeating unit having the following structure (III):

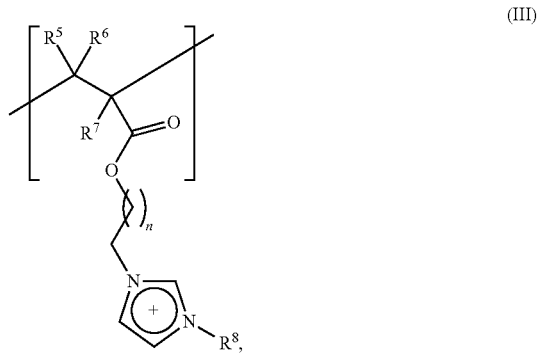

(III)

where $R^5$, $R^6$, $R^7$, and $R^8$ are each independently H or optionally substituted $C_{1-12}$ alkyl, and n has a value in a range from 0 to about 20, or from 0 to about 10, or from 0 to about 5.

9. The electrolyte composition of claim 1, wherein the ionic block comprises polymerized monomer residues selected from acryloyl-imidazolium, acryloyl-pyrrolidinium, acryloyl-pyridinium, vinyl-imidazolium, vinyl-pyrrolidinium, vinyl-pyridinium, styrene-imidazolium, styrene-pyrrolidinium, styrene-pyridinium, and a combination thereof.

10. The electrolyte composition of claim 1, wherein the pendant organic ionic liquid cation comprises 1-butyl(propyl)-1-methylpyrrolidinium ($C_4C_3$mpyr), N-methyl-N-propylpyrrolidinium ($C_3$mpyr), N-butyl-N-methylpyrrolidinium ($C_4$mPyr), 1-ethyl-3-methylimidazolium ($C_2$mim), 1-propyl-3-methylimidazolium ($C_3$mim), 1-butyl-3-methylimidazolium ($C_4$mim), 1-hexyl-3-methylimidazolium ($C_6$mim), 1-octyl-3-methylimidazolium ($C_8$mim), 1-dodecyl-3-methylimidazolium ($C_{12}$mim), 1-hexadecyl-3-methylimidazolium ($C_{16}$mim), 1,2-dimethyl-3-butylimidazolium($C_4(2-C_1)$mim), 1-(3-aminopropyl)-3-methylimidazolium ((3-aminopropyl)mim), 1,2-dimethyl-3-(3-hydroxypropyl)imidazolium (($C_2$—OH)), N-ethyl-tris(2-(2-methoxyethoxy)ethyl) ethane ammonium ($N_{2(2o2o1)3}$), Trihexyl(tetradecyl)phosphonium ($P_{66614}$), Diethyl(methyl)(isobutyl)phosphonium ($P_{122i4}$), Triisobutyl(methyl)phosphonium ($P_{1i4i4i4}$), Triethyl(methyl)phosphonium ($P_{1222}$), Trimethyl(isobutyl)phosphonium ($P_{111i4}$), or a combination thereof.

11. The electrolyte composition of claim 1, wherein the counter anion of the pendant organic ionic liquid cation is selected from alkyl phosphate, biscarbonate, bistriflimide, carbonate, chlorate, formate, glycolate, perchlorate, hexasubstituted phosphate, tetra-substituted borate, optionally fluorinated $C_{1-4}$ alkyl-$BF_3^-$, tosylate, triflate, and a combination thereof.

12. The electrolyte composition of claim 11, wherein the counter anion of the pendant organic ionic liquid cation is selected from bis(trifluoromethanesulfonyl)imide (TFSI), triflate (OTf), tetrafluoroborate ($BF_4$), hexafluorophosphate ($PF_6$), bis(fluorosulfonyl)imide (FSI), fluorosulfonyl-(trifluoromethanesulfonyl) imide (FTFSI), and a combination thereof.

13. The electrolyte composition of claim 1, wherein the pendant anionic moiety comprises derivatives of bis(trifluoromethanesulfonyl)imide (TFSI), triflate (OTf), Tetrafluoroborate ($BF_4$), hexafluorophosphate ($PF_6$), bis(fluorosulfonyl)imide (FSI), fluorosulfonyl-(trifluoromethanesulfonyl) imide (FTFSI), or a combination thereof.

14. The electrolyte composition of claim 1, having a (organic electrolyte:ionic block) molar fraction of between about 0.01 and about 1.

15. The electrolyte composition of claim 1, having a (lithium salt:ionic block) molar fraction of between about 0.01 and about 15.

16. The electrolyte composition of claim 1, wherein the organic electrolyte comprises an organic ionic liquid having a cation and a counter anion, the organic ionic liquid not being covalently coupled to the block copolymer.

17. The electrolyte composition of claim 16, wherein the cation of the organic ionic liquid that is not covalently coupled to the block copolymer is selected from an ammonium cation, a pyridinium cation, a pyrrolidinium cation, a phosphonium cation, and a combination thereof.

18. The electrolyte composition of claim 16, wherein the cation of the organic ionic liquid that is not covalently coupled to the block copolymer is selected from 1-butyl (propyl)-1-methylpyrrolidinium ($C_4C_3$mpyr), N-methyl-N-propylpyrrolidinium ($C_3$mpyr), N-butyl-N-methylpyrrolidinium ($C_4$mPyr), N-ethyl-tris(2-(2-methoxyethoxy)ethyl) ethane ammonium ($N_{2(2o2o1)3}$), Trihexyl(tetradecyl)phosphonium ($P_{66614}$), Diethyl(methyl)(isobutyl)phosphonium ($P_{122i4}$), Triisobutyl(methyl)phosphonium ($P_{1i4i4i4}$), Triethyl (methyl)phosphonium ($P_{1222}$), Trimethyl(isobutyl)phosphonium ($P_{111i4}$), and a combination thereof.

19. The electrolyte composition of claim 16, wherein the anion of the organic ionic liquid that is not covalently coupled to the block copolymer is selected from aqueous or anhydrous alkyl phosphate, biscarbonate, bistriflimide, carbonate, chlorate, formate, glycolate, perchlorate, hexasubstituted phosphate, tetra-substituted borate, optionally fluorinated $C_{1-4}$ alkyl-$BF_3^-$, tosylate, triflate, and a combination thereof.

20. The electrolyte composition of claim 1, wherein the block copolymer is a tri-block copolymer.

21. A lithium-based electrochemical cell comprising a negative electrode and an electrolyte composition as defined in claim 1.

22. The lithium-based electrochemical cell of claim 21, wherein the negative electrode comprises expanded graphite, hard carbon, coke, carbon black, glassy carbon, or a combination thereof.

23. The lithium-based electrochemical cell of claim 21, the cell having a positive electrode comprising an oxide of a lithiated transition metal or a corresponding substitute in which a part of the main transition metal is substituted by one or more other transition metals.

* * * * *

UNITED STATES PATENT AND TRADEMARK OFFICE
CERTIFICATE OF CORRECTION

PATENT NO. : 11,522,220 B2
APPLICATION NO. : 16/649753
DATED : December 6, 2022
INVENTOR(S) : John Chiefari et al.

It is certified that error appears in the above-identified patent and that said Letters Patent is hereby corrected as shown below:

In the Claims

Column 27, Claim 11, Line 6, delete "alkyl-B$3^-$," and insert in its place -- alkyl-BF$_3^-$, --.

Signed and Sealed this
Twenty-eighth Day of February, 2023

Katherine Kelly Vidal
*Director of the United States Patent and Trademark Office*